United States Patent
Tobeta et al.

(10) Patent No.: US 9,945,951 B2
(45) Date of Patent: Apr. 17, 2018

(54) OBJECT DETECTING APPARATUS AND VEHICLE COLLISION AVOIDANCE CONTROL APPARATUS

(71) Applicants: Masakazu Tobeta, Aichi (JP); Yoshio Matsuura, Aichi (JP)

(72) Inventors: Masakazu Tobeta, Aichi (JP); Yoshio Matsuura, Aichi (JP)

(73) Assignee: OMRON AUTOMOTIVE ELECTRONICS CO., LTD., Aichi (JP)

( * ) Notice: Subject to any disclaimer, the term of this patent is extended or adjusted under 35 U.S.C. 154(b) by 66 days.

(21) Appl. No.: 14/989,503

(22) Filed: Jan. 6, 2016

(65) Prior Publication Data
US 2016/0195615 A1    Jul. 7, 2016

(30) Foreign Application Priority Data
Jan. 6, 2015 (JP) .................. 2015-000639

(51) Int. Cl.
| | | |
|---|---|---|
| G01S 17/06 | (2006.01) | |
| B60W 30/06 | (2006.01) | |
| B60W 30/09 | (2012.01) | |
| G01S 17/93 | (2006.01) | |
| G01S 17/10 | (2006.01) | |

(Continued)

(52) U.S. Cl.
CPC ........... *G01S 17/936* (2013.01); *B60W 30/09* (2013.01); *G01S 7/4808* (2013.01); *G01S 7/4816* (2013.01);
(Continued)

(58) Field of Classification Search
CPC ...... G01S 17/936; G01S 17/06; B60W 30/09; B60W 2420/52; B60W 2720/106; B60W 2429/52
See application file for complete search history.

(56) References Cited

U.S. PATENT DOCUMENTS

| | | | |
|---|---|---|---|
| 5,714,928 A | 2/1998 | Sudo et al. | |
| 6,321,147 B1 | 11/2001 | Takeda et al. | |

(Continued)

FOREIGN PATENT DOCUMENTS

| | | |
|---|---|---|
| JP | H05-124453 A | 5/1993 |
| JP | H07-035862 A | 2/1995 |

(Continued)

OTHER PUBLICATIONS

Office Action issued in corresponding Japanese Application No. 2015-000639, dated Oct. 31, 2017 (6 pages).

*Primary Examiner* — Yonel Beaulieu
*Assistant Examiner* — Martin A Weeks
(74) *Attorney, Agent, or Firm* — Osha Liang LLP

(57) ABSTRACT

An object detecting apparatus includes an emission unit that emits measurement light to a monitoring area in a travelling direction a vehicle, the monitoring area being widened radially in a vehicle width direction; a photoreceptor unit that receives reflected light of the measurement light from a plurality of directions in the monitoring area; a detection unit that detects a distance to an object in each direction in the monitoring area, based on a time difference from emission of the measurement light to reception of the reflected light; and a determination unit that identifies the object detected by the detection unit. The determination unit determines whether there is a probability of the detected object being a hill, based on a change of the detected distance in the vehicle width direction among the directions in the monitoring area.

8 Claims, 16 Drawing Sheets

(51) Int. Cl.
*G01S 17/42* (2006.01)
*G01S 7/48* (2006.01)
*G01S 7/481* (2006.01)
*G01S 7/486* (2006.01)

(52) U.S. Cl.
CPC .............. *G01S 17/10* (2013.01); *G01S 17/42* (2013.01); *B60W 2420/52* (2013.01); *B60W 2720/106* (2013.01); *G01S 7/4863* (2013.01)

(56) References Cited

U.S. PATENT DOCUMENTS

| | | | |
|---|---|---|---|
| 8,260,539 B2 * | 9/2012 | Zeng | ..................... G01S 17/936 701/301 |
| 8,724,094 B2 | 5/2014 | Miyahara et al. | |
| 8,736,820 B2 * | 5/2014 | Choe | ....................... G05D 1/024 356/3.01 |
| 8,812,226 B2 * | 8/2014 | Zeng | ..................... G01S 13/723 382/103 |
| 8,825,260 B1 * | 9/2014 | Silver | ................... G01S 17/936 342/118 |
| 2011/0248880 A1 | 10/2011 | Miyahara et al. | |

FOREIGN PATENT DOCUMENTS

| | | |
|---|---|---|
| JP | 2000-330636 A | 11/2000 |
| JP | 2004-280489 A | 10/2004 |
| JP | 2008-140013 A | 6/2008 |
| JP | 2011-232325 A | 11/2011 |

* cited by examiner

OBJECT DETECTING APPARATUS AND VEHICLE COLLISION AVOIDANCE CONTROL APPARATUS

CROSS-REFERENCES TO RELATED APPLICATIONS

This application is based upon and claims the benefit of priority from Japanese Patent Application No. 2015-000639, filed on Jan. 6, 2015; the entire contents of which are incorporated herein by reference.

FIELD

One or more embodiments of the invention relate to an object detecting apparatus and a vehicle collision avoidance control apparatus, particularly to a laser radar device which causes detection accuracy for a hill in a travelling direction of a vehicle to be improved.

BACKGROUND

In the related art, when a vehicle starts, a driver steps erroneously on a brake and an accelerator or steps excessively on the accelerator, and thus an accident of collision of the vehicle with the surrounding object occurs. Regarding this occurrence, a vehicle having a built-in system in which collision occurring by such an erroneous start is avoided or damages in collision are reduced has come on the market. The following technologies have been proposed.

For example, a technology in which a position of a shift lever is fixed to "parking" when an obstacle is detected around a stopped vehicle, and thus moving of the vehicle is prohibited has been proposed (for example, see JP-A-2008-140013).

A technology in which an upper limit value of a revolution count of an engine is limited in accordance with a distance to an obstacle and a stepping speed of a throttle when the obstacle is detected within a predetermined distance from a vehicle has been proposed (for example, see JP-A-5-124453).

A technology in which a vehicle is controlled not to be allowed to start when a distance to an obstacle is smaller than a distance D1, and the vehicle is controlled to start slowly when the distance to the obstacle is greater than the distance D1 and smaller than a distance D2 which has collision risk, in a case where the obstacle is detected during stopping of a vehicle has been proposed (see JP-A-2004-280489).

SUMMARY

However, if one of objects detected around a vehicle is a hill, but all of the detected objects are considered as obstacles, and thus a start of the vehicle is prohibited, the vehicle stops in the front of the hill. Then, a start of the vehicle is not possible and the vehicle does not climb the hill. Even when all of the detected objects are considered as obstacles and thus the vehicle is controlled to slowly start, a driving force is insufficient and the vehicle may not climb the hill.

One or more embodiments of the invention improve detection accuracy for a hill in a travelling direction of a vehicle. One or more embodiments of the invention can appropriately limit a start of the vehicle or limit acceleration in accordance with whether or not an object in the travelling direction of the vehicle is a hill.

In accordance with a first aspect of the present invention, an object detecting apparatus is mountable in a vehicle and detects an object in a travelling direction of the vehicle. The object detecting apparatus includes an emission unit, a photoreceptor unit, a detection unit, and a determination unit. The emission unit emits measurement light to a monitoring area in the travelling direction, and the monitoring area is an area widened radially in a vehicle width direction of the vehicle. The photoreceptor unit receives reflected light of the measurement light from a plurality of directions in the monitoring area, and outputs a light reception signal in accordance with intensity of the reflected light in each of the directions. The detection unit detects a distance to an object in each of the directions in the monitoring area, based on a time difference from emission of the measurement light to reception of the reflected light. The determination unit identifies a detected object which is an object detected by the detection unit. The determination unit determines whether or not there is a probability of the detected object being a hill, based on a change of a detected distance in the vehicle width direction among the directions in the monitoring area.

In the first aspect of the present invention, the measurement light is emitted in the travelling direction of the vehicle in the monitoring area which is the area widened radially in a vehicle width direction of the vehicle. The reflected light of the measurement light is received from the plurality of directions in the monitoring area. The light reception signal is output in accordance with the intensity of the reflected light in each of the directions. A distance to an object in each of the directions in the monitoring area is detected based on the time difference from emission of the measurement light to reception of the reflected light. It is determined whether or not there is a probability of the detected object being a hill, based on the change of the detected distance in the vehicle width direction among the directions in the monitoring area.

Accordingly, detection accuracy for a hill in the travelling direction of a vehicle is improved.

The emission unit includes a driving circuit, a light-emitting element, a projection optical system, and the like, for example. The photoreceptor unit includes a light-receiving optical system and a photoreceptor element such as a photodiode, and the like, for example. The detection unit and the determination unit includes computation devices such as micro-computers and various processors, and the like, for example.

The determination unit may determine that there is a probability of the detected object being a hill, if the change of the detected distance in the vehicle width direction among the directions in the monitoring area is gentle. The determination unit may determine that there is no probability of the detected object being a hill, if the change of the detected distance in the vehicle width direction among the directions in the monitoring area is not gentle.

Thus, the detection accuracy for a hill in the travelling direction of a vehicle is more improved.

The determination unit may determine that the detected object is a hill, if the change of the detected distance in the vehicle width direction among the directions in the monitoring area is gentle, and if the detected distance to the detected object becomes long while movement of the vehicle toward the detected object is detected by using information from the outside.

Thus, it is possible to accurately detect a hill in the travelling direction of a vehicle.

The determination unit may determine that the detected object is not a climbable hill, if the detected distance to the detected object is less than the shortest distance assumed to be detected for a hill having the maximum gradient climbable by the vehicle.

Thus, it is possible to detect an object which is not a climbable hill with rapidity and accuracy.

The emission unit may emit the measurement light so as to spread radially in the monitoring area. The photoreceptor unit may include a plurality of photoreceptor elements which are arranged in the vehicle width direction. Each of the photoreceptor elements may receive the reflected light from each of the directions in the monitoring area and output a light reception signal in accordance with intensity of the received reflected light.

The emission unit may scan the measurement light in the vehicle width direction in the monitoring area.

In accordance with a second aspect of the invention, a vehicle collision avoidance control apparatus includes an emission unit, a photoreceptor unit, a detection unit, a determination unit, and a moving control unit. The emission unit emits measurement light to a monitoring area in a travelling direction of a vehicle, and the monitoring area is an area widened radially in a vehicle width direction. The photoreceptor unit receives reflected light of the measurement light from a plurality of directions in the monitoring area, and outputs a light reception signal in accordance with intensity of the reflected light in each of the directions. The detection unit detects a distance to an object in each of the directions in the monitoring area, based on a time difference from emission of the measurement light to reception of the reflected light. The determination unit identifies a detected object which is an object detected by the detection unit. The moving control unit controls travelling of the vehicle. If the change of the detected distance in the vehicle width direction among the directions in the monitoring area is gentle, the determination unit determines that there is a probability of the detected object being a hill. If the change of the detected distance in the vehicle width direction among the directions in the monitoring area is not gentle, the determination unit determines that there is no probability of the detected object being a hill. If the detected distance to the detected object is less than a predetermined distance and it is determined that there is a probability of the detected object being a hill, the moving control unit performs control to suppress acceleration of the vehicle. If the detected distance to the detected object is less than a predetermined distance and it is determined that there is no probability of the detected object being a hill, the moving control unit performs control to prohibit travelling of the vehicle in the travelling direction.

In the second aspect of the invention, the measurement light is emitted in the travelling direction of the vehicle in the monitoring area which is the area widened radially in a vehicle width direction of the vehicle. The reflected light of the measurement light is received from the plurality of directions in the monitoring area. The light reception signal is output in accordance with the intensity of the reflected light in each of the directions. A distance to an object in each of the directions in the monitoring area is detected based on the time difference from emission of the measurement light to reception of the reflected light. If the change of the detected distance in the vehicle width direction among the directions in the monitoring area is gentle, it is determined that there is a probability of the detected object being a hill. If the change of the detected distance in the vehicle width direction among the directions in the monitoring area is not gentle, it is determined that there is no probability of the detected object being a hill. If the detected distance to the detected object is less than a predetermined distance and it is determined that there is a probability of the detected object being a hill, acceleration of the vehicle is suppressed. If the detected distance to the detected object is less than a predetermined distance and it is determined that there is no probability of the detected object being a hill, travelling of the vehicle in the travelling direction is prohibited.

Accordingly, detection accuracy for a hill in the travelling direction of a vehicle is improved. It is possible to appropriately limit a start of a vehicle or limit acceleration, in accordance with whether or not an object in the travelling direction of the vehicle is a hill.

The emission unit includes a driving circuit, a light-emitting element, a projection optical system, and the like, for example. The photoreceptor unit includes a light-receiving optical system and a photoreceptor element such as a photodiode, and the like, for example. The detection unit, the determination unit, and the moving control unit includes computation devices such as micro-computers and various processors, and the like, for example.

In accordance with a third aspect of the invention, a vehicle collision avoidance control apparatus includes an emission unit, a photoreceptor unit, a detection unit, and a moving control unit. The emission unit emits measurement light to a monitoring area in a travelling direction of a vehicle, and the monitoring area is an area widened radially in a vehicle width direction. The photoreceptor unit receives reflected light of the measurement light from a plurality of directions in the monitoring area, and outputs a light reception signal in accordance with intensity of the reflected light in each of the directions. The detection unit detects a distance to an object in each of the directions in the monitoring area, based on a time difference from emission of the measurement light to reception of the reflected light. The moving control unit controls travelling of the vehicle. The moving control unit performs control to prohibit travelling of the vehicle in the travelling direction if a detected distance to a detected object which is an object detected by the detection unit is less than the shortest distance assumed to be detected for a hill having the maximum gradient climbable by the vehicle.

In the vehicle collision avoidance control apparatus in accordance with the third aspect of the invention, the measurement light is emitted in the travelling direction of the vehicle in the monitoring area which is the area widened radially in a vehicle width direction of the vehicle. The reflected light of the measurement light is received from the plurality of directions in the monitoring area. The light reception signal is output in accordance with the intensity of the reflected light in each of the directions. A distance to an object in each of the directions in the monitoring area is detected based on the time difference from emission of the measurement light to reception of the reflected light. If the detected distance to a detected object which is an object detected by the detection unit is less than the shortest distance assumed to be detected for a hill having the maximum gradient climbable by the vehicle, the vehicle is prohibiting from travelling in the travelling direction.

Accordingly, it is possible to appropriately limit a start of a vehicle in accordance with whether or not an object in the travelling direction of the vehicle is a hill.

The emission unit includes a driving circuit, a light-emitting element, a projection optical system, and the like, for example. The photoreceptor unit includes a light-receiving optical system and a photoreceptor element such as a photodiode, and the like, for example. The detection unit and the moving control unit include computation devices such as micro-computers and various processors, and the like, for example.

According to the first aspect or the second aspect of one or more embodiments of the invention, detection accuracy for a hill in the travelling direction of a vehicle is improved.

According to the second aspect or the third aspect of one or more embodiments of the invention, it is possible to appropriately limit a start of a vehicle or limit acceleration, in accordance with whether or not an object in the travelling direction of the vehicle is a hill.

DETAILED DESCRIPTION

In embodiments of the invention, numerous specific details are set forth in order to provide a thorough understanding of the invention. However, it will be apparent to one of ordinary skill in the art that the invention may be practiced without these specific details. In other instances, well-known features have not been described in detail to avoid obscuring the invention.

Hereinafter, one or more forms (referred to as embodiments) for embodying the invention will be described. Descriptions will be made in the following sequences.

1. Embodiments
2. Modification Example
<1. Embodiment>
<Configuration Example of Vehicle Built-In System 1>

Figure 1:
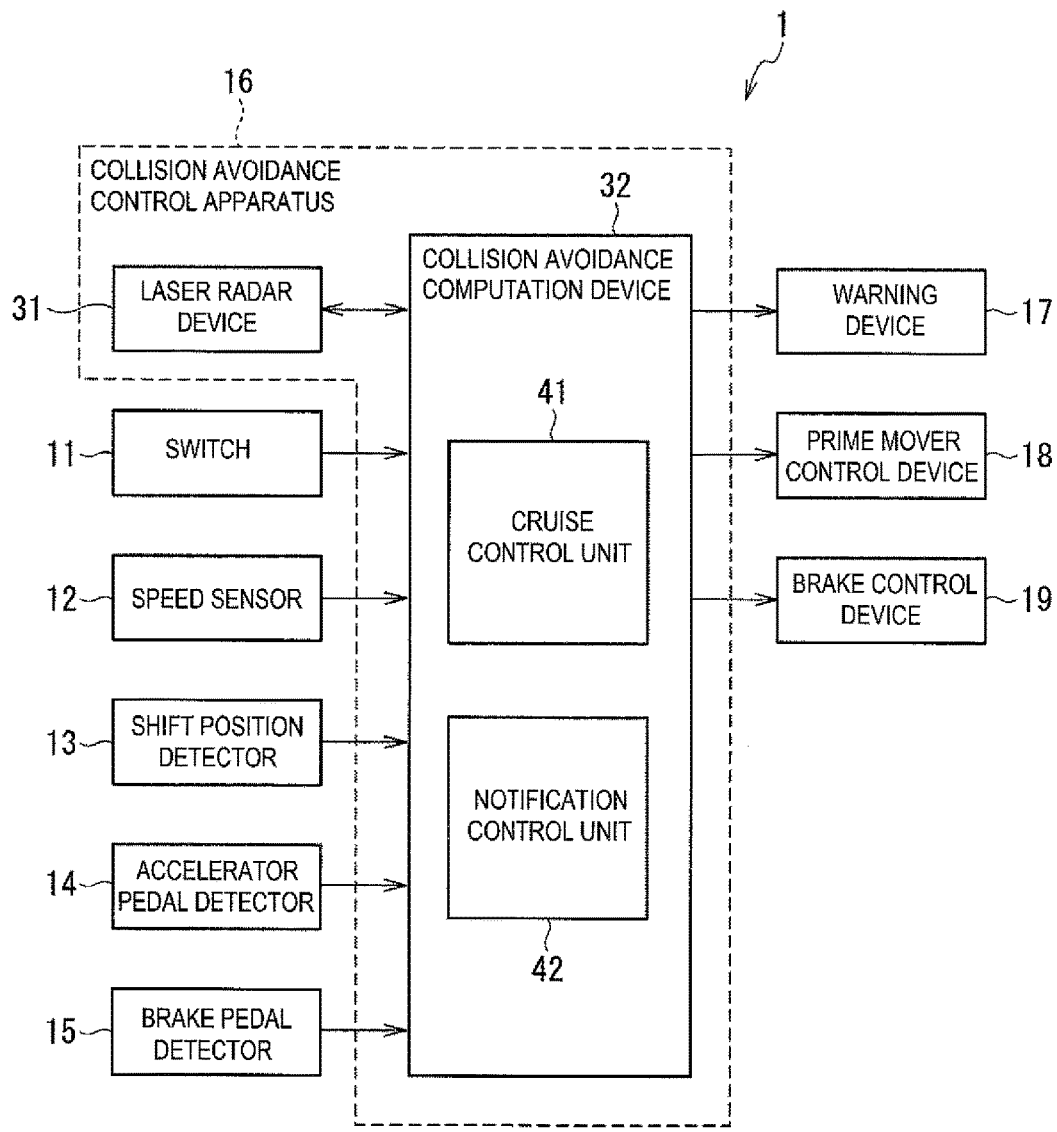
FIG. 1 is a block diagram illustrating one embodiment of a vehicle built-in system to which one or more embodiments of the invention is applied.

FIG. 1 illustrates a configuration example of a vehicle built-in system 1 according to one embodiment of the invention.

The vehicle built-in system 1 includes a switch 11, a speed sensor 12, a shift position detector 13, an accelerator pedal detector 14, a brake pedal detector 15, a collision avoidance control apparatus 16, a warning device 17, a prime mover control device 18, and a brake control device 19.

In the following descriptions, when distinguishing between a vehicle having the vehicle built-in system 1 provided therein and other vehicles is required, the vehicle having the vehicle built-in system 1 provided therein is referred to as an own vehicle. In the following descriptions, a direction parallel to a right and left direction (vehicle width direction) of the own vehicle is referred to as a horizontal direction.

The switch 11 includes an ignition switch, a power switch, or the like, for example. The switch 11 is, for example, used in starting or stopping of a prime mover (for example, engine, motor, or the like) of the own vehicle, and in switching of a supply mode of power to electronic equipment. The switch 11 supplies a signal indicating a set position or operation details to a collision avoidance computation device 32 of the collision avoidance control apparatus 16.

The speed sensor 12 detects a speed of the own vehicle and supplies a detection result to the collision avoidance computation device 32 of the collision avoidance control apparatus 16.

The shift position detector 13 detects a position (set position) of a shift lever (not illustrated) or a select lever (not illustrated) of the own vehicle. The shift position detector 13 supplies a detection result to the collision avoidance computation device 32 of the collision avoidance control apparatus 16.

The accelerator pedal detector 14 detects an accelerator opening of the own vehicle and supplies a detection result to the collision avoidance computation device 32 of the collision avoidance control apparatus 16.

The brake pedal detector 15 detects a stepping quantity of a brake pedal (not illustrated) of the own vehicle and supplies to a detection result to the collision avoidance computation device 32.

The collision avoidance control apparatus 16 controls a collision avoidance function of avoiding collision of the own vehicle with the surrounding object. The collision avoidance control apparatus 16 includes a laser radar device 31 and the collision avoidance computation device 32.

The laser radar device 31 monitors the front of the own vehicle, and detects whether or not an object is in the front of the own vehicle, the type of the object, a distance to the object, a direction of the object, a relative speed of the object, and the like. The laser radar device 31 transmits commands regarding a start and acceleration of the own vehicle, warning a driver, and the like to the collision avoidance computation device 32, based on a detection result.

In the following descriptions, an area which allows the laser radar device 31 to detect an object is referred to as a monitoring area.

The collision avoidance computation device 32 corresponds to an electronic control unit (ECU) in which a control program is installed, for example. The collision avoidance computation device 32 includes a micro-computer, a storage element, an input and output interface, and the like. The collision avoidance computation device 32 includes a moving control unit 41 and a notification control unit 42.

The moving control unit 41 controls the prime mover control device 18 and the brake control device 19 based on the command from the laser radar device 31, so as to suppress a start or acceleration of the own vehicle. The moving control unit 41 detects a moving direction of the own vehicle, based on information from the outside such as the detection result of a vehicle speed by the speed sensor 12, and the detection result of a position of the shift lever or the select lever by the shift position detector 13. The moving control unit 41 supplies a detection result of the moving direction of the own vehicle to the laser radar device 31.

The notification control unit 42 controls the warning device 17 to perform warning, based on the command from the laser radar device 31.

For example, the warning device 17 includes a display device, a light-emitting device, a sound outputting device, and the like. An example of the display device includes a display provided in a car navigation system or an instrument panel. An example of the light-emitting device includes an indicator lamp and a light emitting diode (LED). An example of the sound outputting device includes a buzzer.

The prime mover control device 18 controls the prime mover (for example, engine, motor, or the like) of the own vehicle. For example, when the prime mover of the own vehicle is an engine, the prime mover control device 18 controls a throttle opening and the like of the engine. For example, when the prime mover of the own vehicle is a motor, the prime mover control device 18 controls a revolution count and the like of the motor.

The brake control device 19 controls an operation of a brake of the own vehicle and controls an automatic brake, for example.

<Configuration Example of Laser Radar Device 31>

Figure 2:
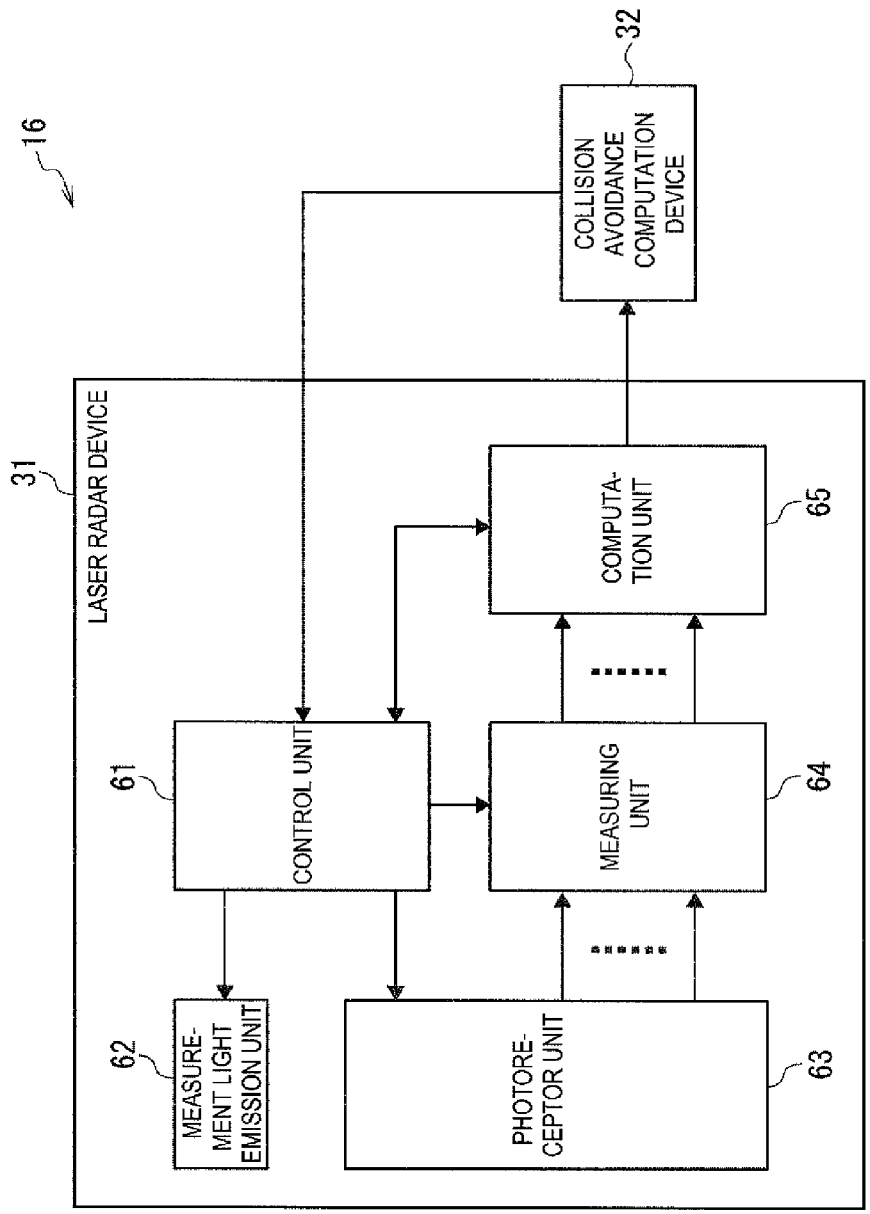
FIG. 2 is a block diagram illustrating a configuration example of a laser radar device.

FIG. 2 illustrates a configuration example of the laser radar device 31. The laser radar device 31 includes a control unit 61, a measurement light emission unit 62, a photoreceptor unit 63, a measuring unit 64, and a computation unit 65.

The control unit 61 controls the units of the laser radar device 31 based on the command from the collision avoidance computation device 32, information, or the like.

The measurement light emission unit 62 emits measurement light to the monitoring area. The measurement light corresponds to a pulse-like laser beam (laser pulse) used in detection of an object.

The photoreceptor unit 63 receives reflected light of the measurement light and detects intensity (brightness) of the reflected light in the horizontal direction from different directions. The photoreceptor unit 63 outputs a plurality of light reception signals which are electrical signals in accordance with the intensity of the reflected light in the directions.

The measuring unit 64 measures a light reception value for the reflected light in the photoreceptor unit 63, based on the analog light reception signal supplied from the photoreceptor unit 63. The measuring unit 64 supplies a digital light reception signal indicating the measured light reception value to the computation unit 65.

The computation unit 65 detects whether or not an object is in the monitoring area, the type of the object, a distance to the object, a direction of the object, a relative speed of the object, and the like, based on the light reception signal supplied from the measuring unit 64. The computation unit 65 supplies a detection result to the control unit 61. The computation unit 65 transmits commands regarding a start and acceleration of the own vehicle, warning a driver, and the like to the collision avoidance computation device 32, based on the detection result.

<Configuration Example of Measurement Light Emission Unit 62>

Figure 3:
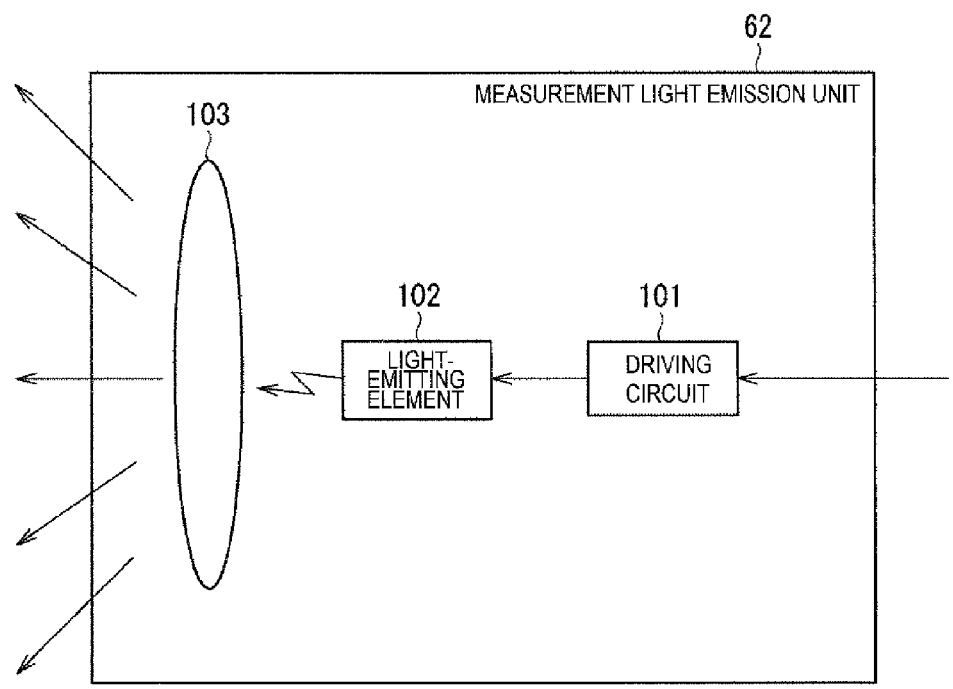
FIG. 3 is a block diagram illustrating a configuration example of a measurement light emission unit.

FIG. 3 illustrates a configuration example of the measurement light emission unit 62 of the laser radar device 31. The measurement light emission unit 62 includes a driving circuit 101, a light-emitting element 102, and a projection optical system 103.

The driving circuit 101 controls light emission intensity, a light emission timing, or the like of the light-emitting element 102 under a control of the control unit 61.

The light-emitting element 102 includes, for example, a laser diode and emits measurement light (laser pulse) under a control of the driving circuit 101. The measurement light emitted from the light-emitting element 102 passes through the projection optical system 103 including a lens and the like, and is projected to the monitoring area which is widened radially in the horizontal direction (vehicle width direction), in the front of the own vehicle.

<Configuration Example of Photoreceptor Unit 63>

Figure 4:
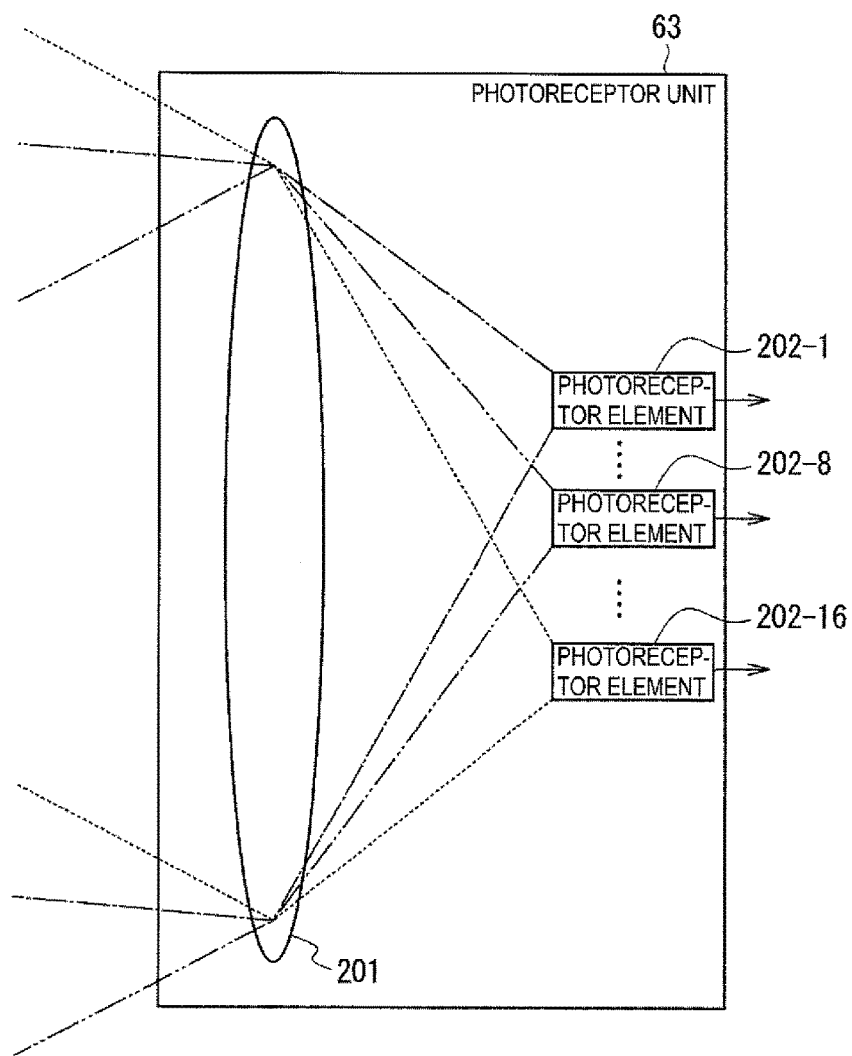
FIG. 4 is a block diagram illustrating a configuration example of a photoreceptor unit.

FIG. 4 illustrates a configuration example of the photoreceptor unit 63 of the laser radar device 31. The photoreceptor unit 63 includes a light-receiving optical system 201 and photoreceptor elements 202-1 to 202-16.

In the following descriptions, when individually distinguishing of the photoreceptor elements 202-1 to 202-16 is not required, the photoreceptor elements 202-1 to 202-16 are simply referred to as photoreceptor elements 202.

The light-receiving optical system 201 includes lens and the like and is disposed so as to cause an optical axis to be directed to a forth and back direction of a vehicle. In the light-receiving optical system 201, reflected light of the measurement light, which is reflected by an object and the like in the monitoring area is incident, and the incident reflected light is caused to be incident on a light receiving surface of each of the photoreceptor elements 202.

Each of the photoreceptor elements 202 includes, for example, a photodiode which performs photoelectric conversion of the incident photoelectric charge into a light reception signal having a current value in accordance with the light quantity. The photoreceptor elements 202 are provided at a position at which the reflected light which is incident on the light-receiving optical system 201 is condensed such that the photoreceptor elements 202 are arranged in series so as to be vertical to the optical axis of the light-receiving optical system 201 and parallel (that is, in the horizontal direction) to the vehicle width direction. The reflected light which has been incident on the light-receiving optical system 201 is divided so as to be incident on the photoreceptor elements 202 in accordance with an incident angle of the reflected light to the light-receiving optical system 201 in the horizontal direction. Accordingly, the photoreceptor elements 202 respectively receive reflected light beams from different directions in the horizontal direction, among reflected light beams from the monitoring area. Thus, the monitoring area is divided into a plurality of areas (referred to as detection areas below) in a plurality of directions of the horizontal direction. The photoreceptor elements 202 receives individually reflected light beams from the detection areas which respectively correspond to the photoreceptor elements 202. The photoreceptor element 202 performs photoelectric conversion of the received reflected light into a light reception signal having a current value in accordance with the light-receiving quantity, and supplies the obtained light reception signal to the measuring unit 64.

<Specific Example of Monitoring Area and Detection Area>

Figure 5:
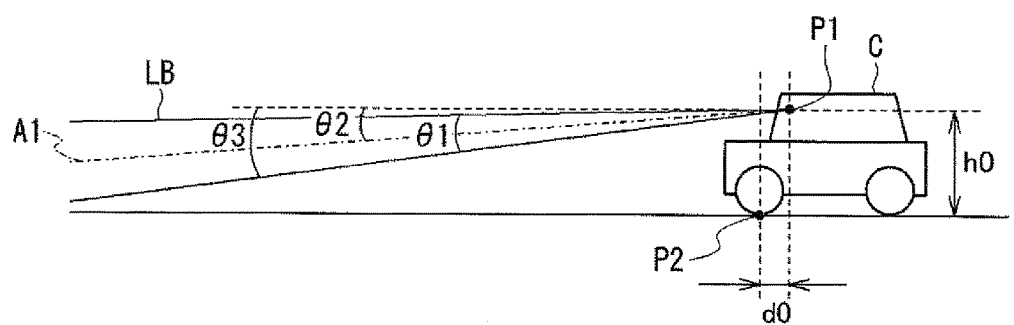
FIG. 5 is a schematic diagram when an application range of measurement light is viewed from the side.
Figure 6:
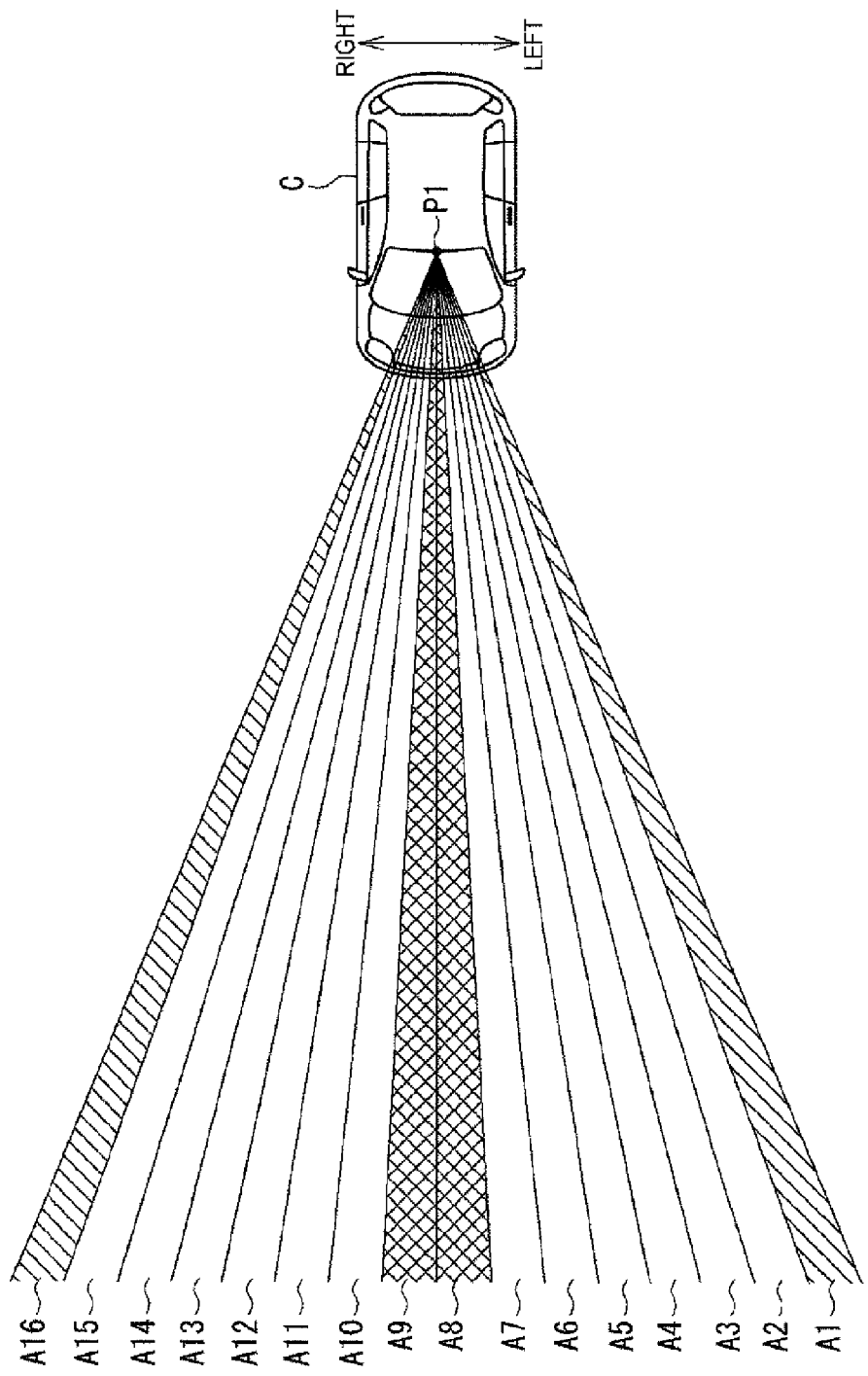
FIG. 6 is a schematic diagram when positions of detection areas are viewed from the top.
Figure 7:
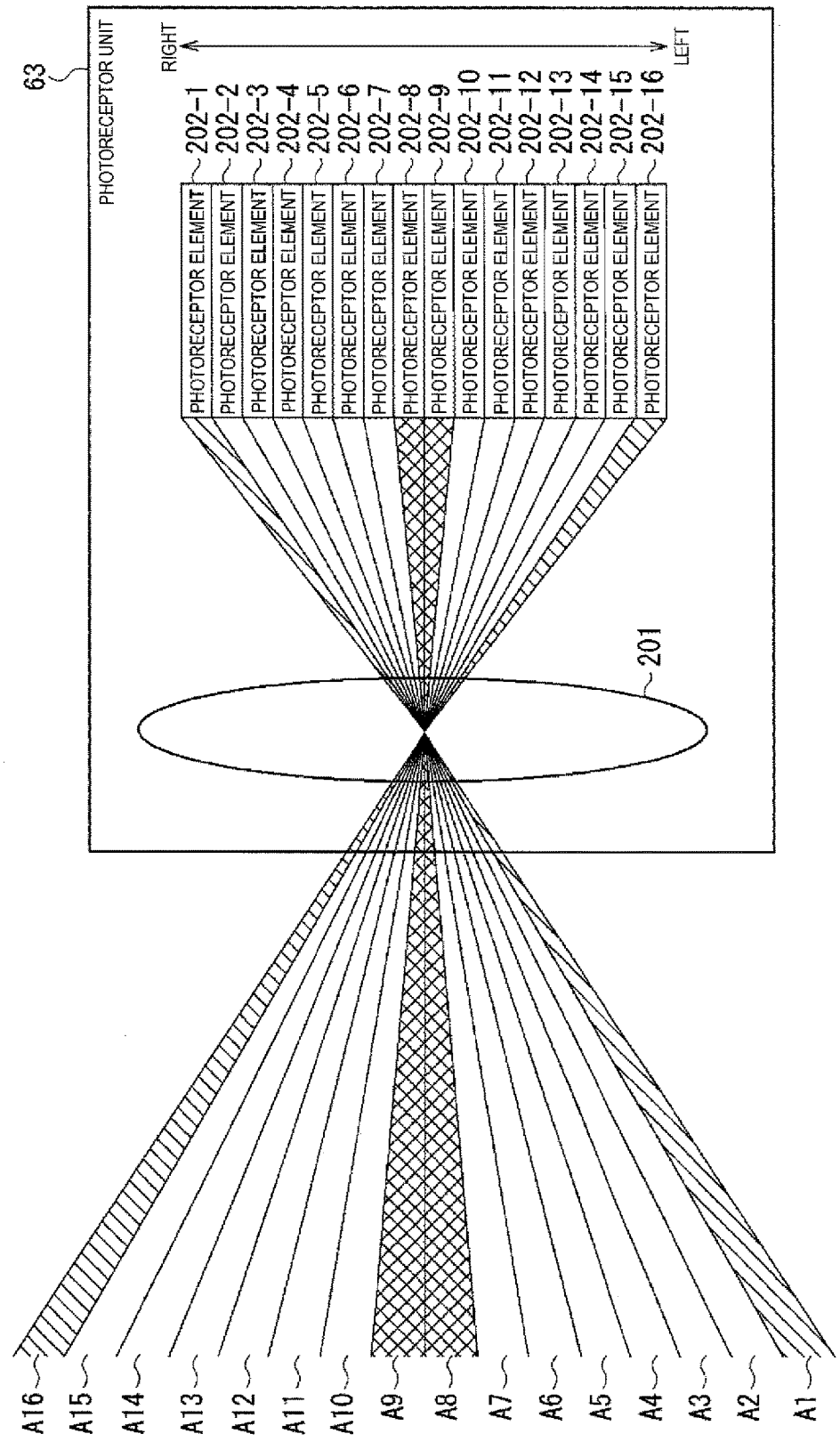
FIG. 7 is a schematic diagram illustrating a relationship between each photoreceptor element and each of the detection areas.

Here, a specific example of the monitoring area and the detection area will be described with reference to FIGS. 5 to 7. FIG. 5 schematically illustrates an application range of the measurement light when a vehicle C having the laser radar device 31 provided therein is viewed from the side. FIG. 6 schematically illustrates a position of each detection area when the vehicle C is viewed from the top. FIG. 7 schematically illustrates a relationship between the photoreceptor elements 202 and detection areas when the photoreceptor unit 63 is viewed from the top. FIG. 7 schematically illustrates only rays in the reflected light from the detection areas, which passes through the middle of a lens of the light-receiving optical system 201, for easy understanding of the drawing.

As illustrated in FIG. 5, the laser radar device 31 is provided, for example, on the inner side (in the vehicle) of a wind shield (not illustrated) of the vehicle C and on a back side of a rearview mirror (not illustrated) of the vehicle C. Measurement light LB is emitted toward the front of the vehicle C from the measurement light emission unit 62 of the laser radar device 31, so as to spread radially in the horizontal direction and a up and down direction (vertical direction).

In the following descriptions, as illustrated in FIG. 5, a position of emission of the measurement light LB is set as a position P1. In the following descriptions, a height of the position P1 from a road surface is set as a height h0. In the following descriptions, a distance between a lower end P2 of a front wheel of the vehicle C and the position P1 is set as a distance d0. In the following descriptions, a viewing angle of the measurement light LB in the vertical direction is set as an angle θ1, and an inclination of the measurement light LB to the vision axis A1 is set as an angle θ2. An inclination of a lower end of the measurement light LB is set as an angle θ3.

As illustrated in FIG. 7, the photoreceptor elements 202 are arranged in series in an order of the photoreceptor elements 202-1, 202-2, 202-3, . . . from the right in a travelling direction of the vehicle C. On the contrary, as illustrated in FIG. 6, the monitoring area of the laser radar device 31 includes detection areas A1 to A16 which are widened radially in the front of the vehicle C. The detection areas are arranged in an order of the detection areas A1, A2, A3, . . . from the left in the travelling direction of the vehicle C. For example, the photoreceptor element 202-1 is at a left end of the monitoring area and receives a reflected light beam from the detection area A1 indicated by an oblique line in the front left of the vehicle C. The photoreceptor element 202-16 is at a right end of the monitoring area and receives a reflected light beam from the detection area A16 indicated by an oblique line in the front right of the vehicle C. The photoreceptor elements 202-8 and 202-9 receive reflected light beams from the detection areas A8 and A9 indicated by shading at the center of the monitoring area.

<Configuration Example of Measuring Unit 64>

Figure 8:
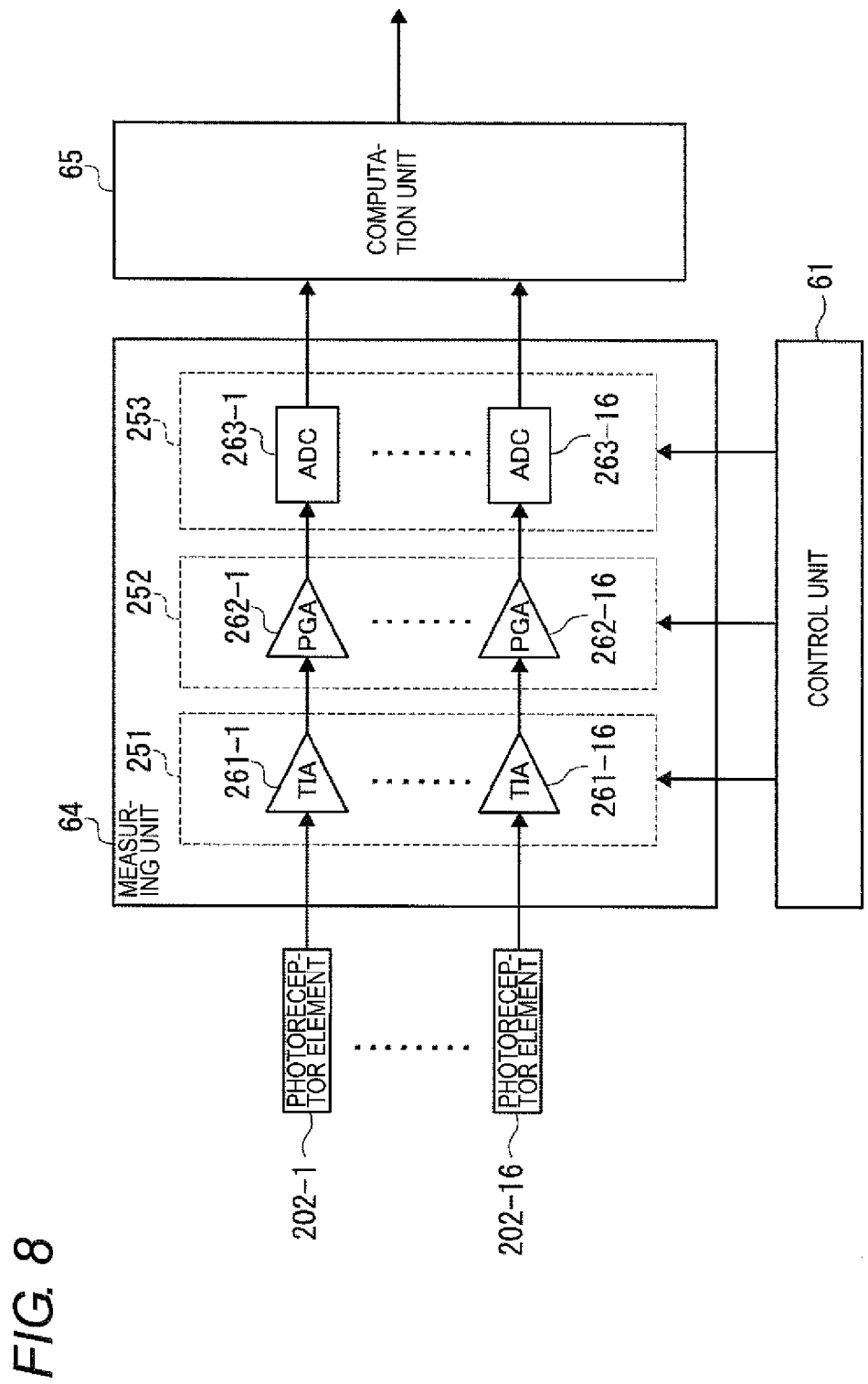
FIG. 8 is a block diagram illustrating a configuration example of a measuring unit.

FIG. 8 illustrates a configuration example of the measuring unit 64 of the laser radar device 31. The measuring unit 64 includes a current voltage conversion unit 251, an amplification unit 252, and a sampling unit 253. The current voltage conversion unit 251 includes transformer impedance amplifiers (TIAs) 261-1 to 261-16. The amplification unit 252 includes programmable gain amplifiers (PGAs) 262-1 to 262-16. The sampling unit 253 includes A/D converters (ADCs) 263-1 to 263-16. The TIA 261-$i$, the PGA 262-$i$, and the ADC 263-$i$ ($i$=1 to 16) are connected in series to each other.

In the following descriptions, when individually distinguishing of the TIAs 261-1 to 261-16, the PGAs 262-1 to 262-16, and the ADCs 263-1 to 263-16 is not required, the TIAs 261-1 to 261-16 are simply referred to as TIAs 261, the PGAs 262-1 to 262-16 are simply referred to as PGAs 262, and the ADCs 263-1 to 263-16 are simply referred to as ADCs 263.

Each of the TIAs 261 performs current-to-voltage conversion on a light reception signal supplied from the photoreceptor element 202 under a control of the control unit 61. That is, each of the TIAs 261 converts the light reception signal as an input current into the light reception signal as a voltage, and amplifies the voltage of the light reception signal obtained by conversion with a gain which is set by the control unit 61. Each of the TIAs 261 supplies the amplified light reception signal to the corresponding PGA 262 at the subsequent stage.

Each of the PGAs 262 amplifies a voltage of the light reception signal supplied from the corresponding TIA 261 with a gain which is set by the control unit 61, and supplies the amplified light reception signal to the corresponding ADC 263 at the subsequent stage, under a control of the control unit 61.

Each of the ADCs 263 performs A/C conversion of the light reception signal. That is, each of the ADCs 263 performs sampling on the analog light reception signal supplied from the corresponding PGA 262 at a predetermined sampling interval under a control of the control unit 61, and thus measures a light reception value at each sampling time. Each of the ADCs 263 supplies a digital light reception signal indicating a sampling result (measurement result) of the light reception value to the computation unit 65.

<Configuration Example of Computation Unit 65>

Figure 9:
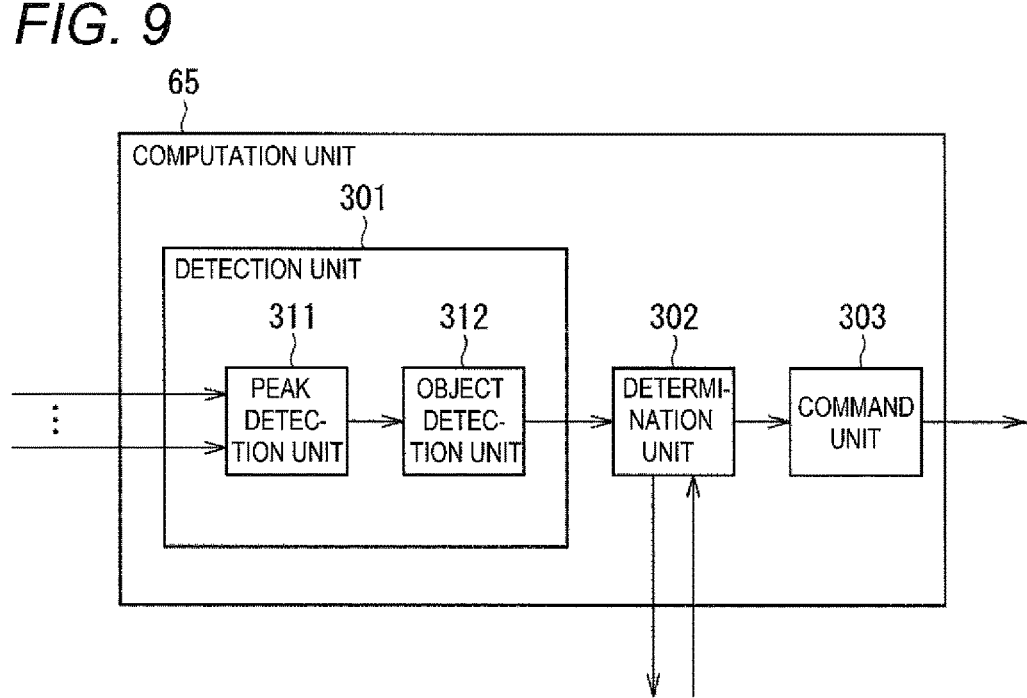
FIG. 9 is a block diagram illustrating a functional configuration example of a computation unit.

FIG. 9 illustrates a functional configuration example of the computation unit 65. The computation unit 65 includes a detection unit 301, a determination unit 302, and a command unit 303.

The detection unit 301 detects an object in the monitoring area. The detection unit 301 includes a peak detection unit 311 and an object detection unit 312.

The peak detection unit 311 detects a peak of the light reception value of each of the photoreceptor element 202 based on the light reception signals supplied from the ADCs 263. Thus, peaks of the intensity of the reflected light of the measurement light in the horizontal direction and a time direction (distance direction) are detected. The peak detection unit 311 supplies a detection result to the object detection unit 312.

The object detection unit 312 detects whether or not an object is in the monitoring area, a direction in which objects are present, a distance to the object, a direction of the object, a relative speed of the object, and the like, based on the detection result for distribution and the peaks of the light reception value (intensity of reflected light) in the horizontal direction and the time direction (distance direction). The object detection unit 312 supplies a detection result to the determination unit 302. The object detection unit 312 supplies a detection result of a detected distance in each of the detection areas to the determination unit 302.

The determination unit 302 obtains a detection result in the moving direction of the own vehicle from the moving control unit 41. The determination unit 302 determines an object detected by the object detection unit 312, based on a detected distance to the object which is detected by the object detection unit 312, a detected distance in each of the detection areas, the moving direction of the own vehicle which is detected by the moving control unit 41, and the like. For example, the determination unit 302 determines, for example, whether or not there is a probability of an object which is detected by the object detection unit 312 being a hill, and whether or not there is a probability of an object which is detected by the object detection unit 312 being a climbable hill. Here, the hill is not limited to, for example, a sloping road on which a road for travelling of a vehicle is provided. For example, the hill also includes a hill on which a road is not provided. The determination unit 302 supplies a detection result of the object including determination result for the object to the control unit 61 and the command unit 303.

The command unit 303 transmits a command regarding a start, acceleration, or the like of the own vehicle to the moving control unit 41 in accordance with the detection result of the object supplied from the determination unit 302. The command unit 303 transmits a command regarding warning of driver and the like to the notification control unit 42 in accordance with the detection result of the object supplied from the determination unit 302.

<Monitoring Processing>

Figure 10:
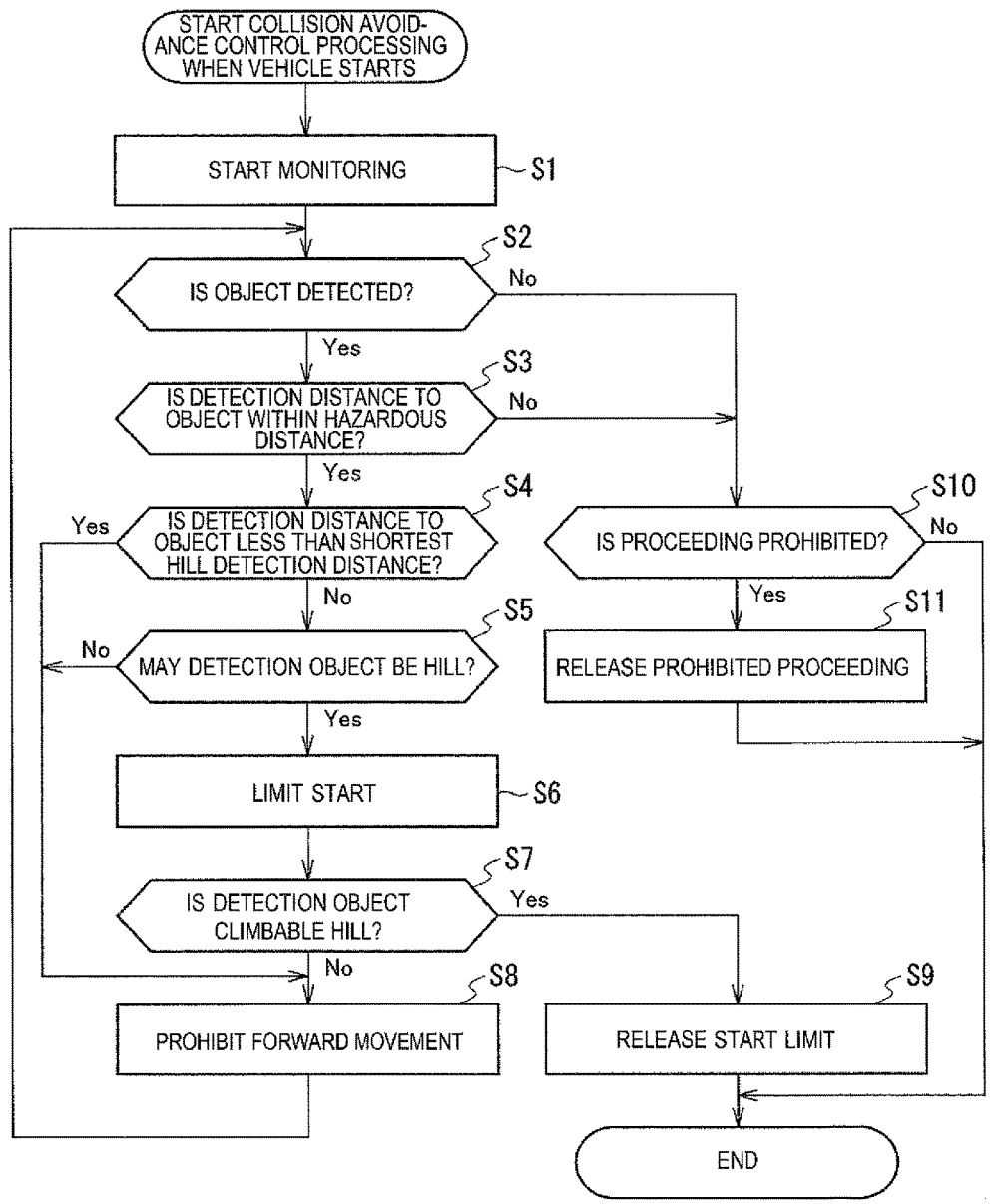
FIG. 10 is a flowchart illustrating collision avoidance control processing when a vehicle starts.

Next, collision avoidance control processing when a vehicle starts, which is performed by the vehicle built-in system 1 will be described with reference to a flowchart in FIG. 10. This processing is started, for example, when the position of the switch 11 is set to be a position allowing a start of the own vehicle.

In Step S1, the laser radar device 31 starts monitoring. That is, the laser radar device 31 starts monitoring of the monitoring area in the front of the own vehicle by starting the following processes.

The driving circuit 101 emits pulse-like measurement light from the light-emitting element 102 under a control of the control unit 61. The measurement light emitted from the light-emitting element 102 is projected to the entirety of the monitoring area through the projection optical system 103.

Each of the photoreceptor elements 202 receives reflected light from the detection area of the corresponding direction against the measurement light projected from the measurement light emission unit 62 through the light-receiving optical system 201. Each of the photoreceptor elements 202 performs photoelectric conversion of the received reflected light into a light reception signal which is an electrical signal, in accordance with the light-receiving quantity, and supplies the obtained light reception signal to the corresponding TIA 261 at the subsequent stage.

Each of the TIAs 261 performs current-to-voltage conversion on a light reception signal supplied from the corresponding photoreceptor element 202, and amplifies a voltage of the light reception signal with a gain which is set by the control unit 61, under a control of the control unit 61. Each of the TIAs 261 supplies the amplified light reception signal to the corresponding PGA 262 at the subsequent stage.

Each of the PGAs 262 amplifies a voltage of the light reception signal supplied from the corresponding TIA 261 with a gain which is set by the control unit 61, and supplies the amplified light reception signal to the corresponding ADC 263 at the subsequent stage, under a control of the control unit 61.

Each of the ADCs 263 performs sampling on the light reception signal supplied from the corresponding PGA 262 and performs A/D conversion on the light reception signal, under a control of the control unit 61. Each of the ADCs 263 supplies a digital light reception signal indicating a sampling value (light reception value) at each sampling time to the peak detection unit 311.

The peak detection unit 311 detects a sampling time at which the light reception value for each of the photoreceptor elements 202 is a peak. That is, the peak detection unit 311 detects a peak of the light reception value in the time direction in each of the detection areas in the horizontal direction, which relatively correspond to the photoreceptor elements 202. The peak detection unit 311 supplies a detection result to the object detection unit 312.

The object detection unit 312 detects a distance (referred to as a detected distance) from the own vehicle to an object which reflects the measurement light in each of the detection areas, based on, for example, a time difference from emission of the measurement light to the time when the light reception value becomes a peak. That is, object detection unit 312 detects the detected distance to the object in each of directions in the monitoring area. The object detection unit 312 detects whether or not an object is in the monitoring area, a direction in which objects are present, a distance to the object, a direction of the object, a relative speed of the object, and the like, based on the detected distance in each of the detection areas at the current time and the detected distance in each of the detection areas at the previous time.

Here, for example, when one object is present so as to cross over the plurality of detection areas, a plurality of detected distances to the object for the detection areas is detected. In this case, for example, the minimum value, an average value, or the like of the plurality of the detected distances detected for the object is obtained as the detected distance to the object.

The object detection unit 312 supplies a detection result regarding the presence or absence of an object in the monitoring area, a direction in which objects are present, a distance to the object, a direction of the object, a relative speed of the object, and the like to the determination unit 302. The object detection unit 312 supplies a detection result of detected distances in the detection areas to the determination unit 302.

As an object detection method of the object detection unit 312, any method may be employed. An example of the object detected by the object detection unit 312 includes other vehicles, a pedestrian, a road supplementary object, a hill, and the like.

In Step S2, the determination unit 302 determines whether or not the object is detected, based on the latest detection result from the object detection unit 312. When it is determined that the object is detected, the process proceeds to Step S3.

In Step S3, the determination unit 302 determines whether or not the detected distance to the object is within a hazardous distance. The hazardous distance refers to a distance in which collision may occur if the own vehicle performs erroneously sudden acceleration. For example, the hazardous distance is set based on acceleration performance and the like of the own vehicle. When it is determined that the detected distance to the object is within a hazardous distance, the process proceeds to Step S4.

In Step S4, the determination unit 302 determines whether or not the detected distance to the object is less than a shortest bill detected distance. The shortest hill detected distance refers to the shortest distance which is assumed that the laser radar device 31 detects a hill that the own vehicle can climb.

An example of a calculation method of the shortest hill detected distance of the vehicle C which is described with reference to FIG. 5 will be described with reference to FIG. 11.

A detected distance from the vehicle C to a climbable hill becomes the shortest when the vehicle C approaches a hill S0 which has the steepest gradient among climbable hills, most closest. At this time, as illustrated in the upper figure of FIG. 11, the lower end P2 of the front wheel of the vehicle C has a state of being brought into nearly contact with a lower end of the hill S0.

In the following descriptions, a gradient angle of the hill S0 is set as $\gamma 0$. In the following descriptions, in a state illustrated in the upper figure of FIG. 11, a point at which the hill S0 comes into contact with the lower end of the measurement light LB is set as a point P3, and the height of the point P3 is set as ht. In the following descriptions, a distance to the hill S0, which is detected by the laser radar device 31 in this state, that is, the shortest hill detected distance is set as Lmin.

Figure 11:
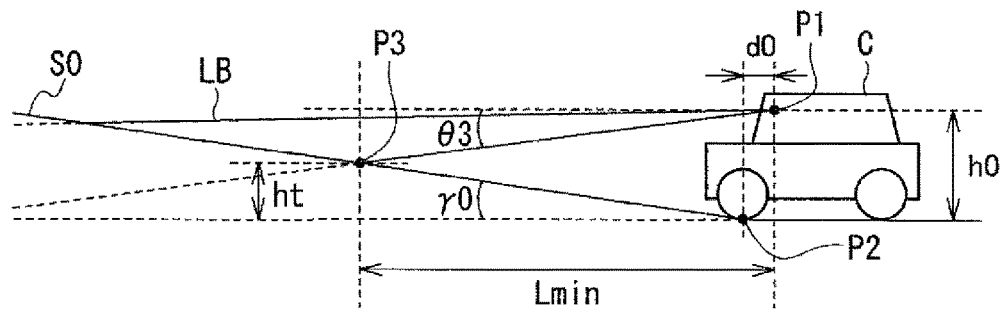
FIG. 11 is a diagram illustrating a calculation method of a shortest hill detected distance.
Figure 11:
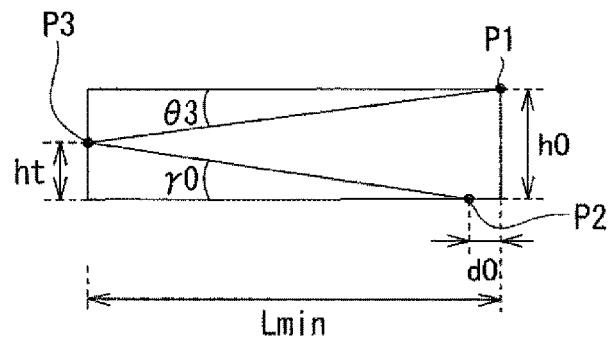

The lower figure of FIG. 11 schematically illustrates a position relationship of the points P1 to P3. The following expressions (1) and (2) are established by this figure.

$$\tan \gamma 0 = ht/(L\min - d0) \quad (1)$$

$$\tan \theta 3 = (h0 - ht)/L\min \quad (2)$$

The height ht is represented by the following expression (3) from the expression (1).

$$ht = \tan \gamma 0 \times (L\min - d0) \quad (3)$$

The expression (3) is substituted for the expression (2) and arrangement is performed. Thus, as represented as the following expression (4), the shortest hill detected distance Lmin is obtained.

$$L\min = (h0 + d0 \cdot \tan \gamma 0)/(\tan \gamma 0 + \tan \theta 3) \quad (4)$$

For example, when h0=1.42 m, d0=0.56 m, $\theta 3$=7.0 degrees are set and $\gamma 0$ is set as 6.8 degrees which is the maximum gradient angle of a hill that can be processed in Japan, the shortest hill detected distance Lmin is 6.143 m.

For example, when h0=1.42 m, d0=0.56 m, $\theta 3$=7.0 degrees are set and $\gamma 0$ is set as 17.7 degrees which is the maximum gradient angle climbable by a general vehicle, the shortest hill detected distance Lmin is 3.618 m. Here, 17.7 degrees which is the maximum gradient angle climbable by the general vehicle is a value set based on "3. A study on the limits of longitudinal gradient", Technology Note of National Institute for Land and Infrastructure Management No. 667, issued by National Institute for Land and Infrastructure Management, Japan.

The actual gradient angle $\gamma 0$ is set for each type of vehicle based on causes such as cubic capacity and weight, for example.

Figure 12:
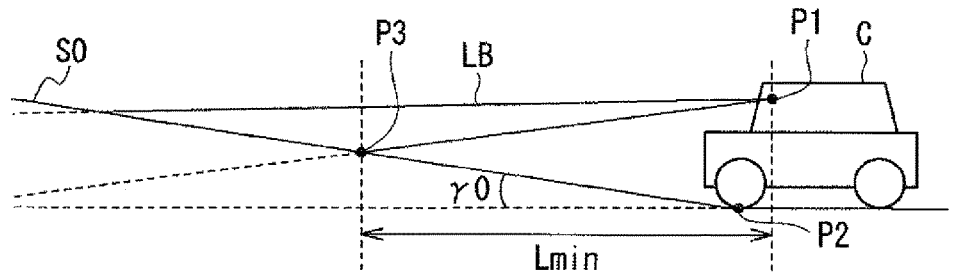
FIG. 12 is a diagram illustrating a change of a detected distance to a hill before the hill is climbed and after climbing is started.
Figure 12:
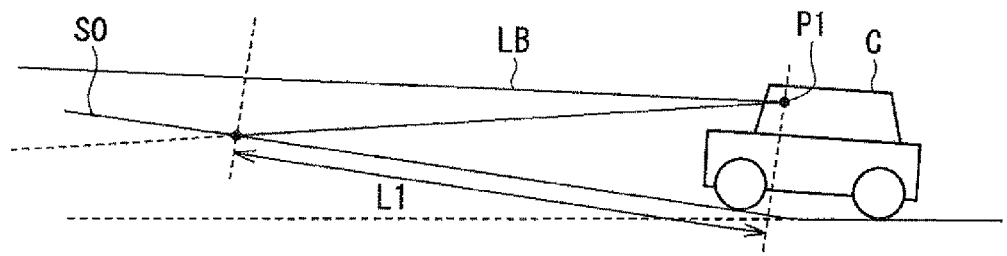

The upper figure of FIG. 12 illustrates a state where the vehicle C approaches the hill S0 closest, similarly to the upper figure of FIG. 11. The lower figure of FIG. 12 illustrates a state where the vehicle C starts to climb the hill S0. As will be described in this example, if the vehicle C starts to climb the hill S0, a detected distance L1 of the laser radar device 31 is longer than the shortest hill detected distance Lmin. Accordingly, the detected distance from the vehicle C to the climbable hill is not less than the shortest hill detected distance Lmin. Conversely, when the detected distance to an object is less than the shortest hill detected distance Lmin, it may be determined at least that the object is not a hill that the vehicle C can climb.

Figure 13:
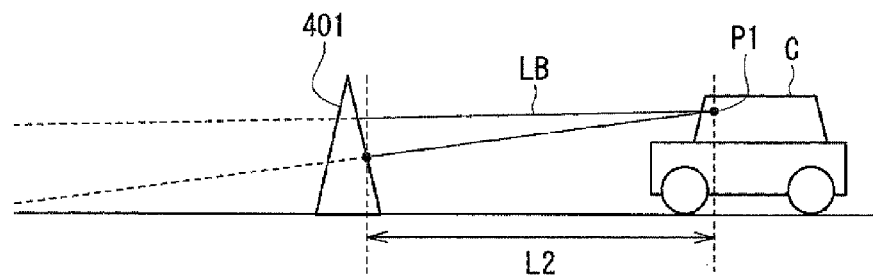
FIG. 13 is a diagram illustrating a first example in which a detected distance to an object is less than the shortest hill detected distance.
Figure 14:
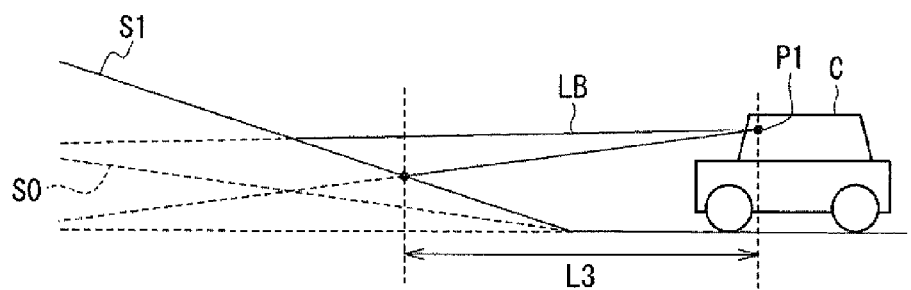
FIG. 14 is a diagram illustrating a second example in which the detected distance to an object is less than the shortest hill detected distance.

FIGS. 13 and 14 illustrate an example in which the detected distance to an object is less than the shortest hill detected distance Lmin. Specifically, FIG. 13 illustrates a state where the vehicle C approaches an obstacle 401 and a detected distance L2 of the laser radar device 31 is shorter than the shortest hill detected distance Lmin. FIG. 14 illustrates a state where the vehicle C approaches a hill S2 having a gradient steeper than the hill S0, and a detected distance L3 of the laser radar device 31 is shorter than the shortest hill detected distance Lmin.

In this manner, the detected distance to an object becomes less than the shortest hill detected distance Lmin when the vehicle C approaches a hill S1 having a gradient steeper than the hill S0, in addition to a case where the vehicle C approaches the obstacle 401.

In Step S4, when it is determined that the detected distance to an object is equal to or greater than the shortest hill detected distance, the process proceeds to Step S5.

In Step S5, the determination unit 302 determines whether or not there is a probability of the detected object being a hill. Specifically, the determination unit 302 determines whether or not there is a probability of the detected object being a hill, based on a change of the detected distances in the horizontal direction (vehicle width direction) in the detection areas (each of the photoreceptor elements 202).

Figure 15:
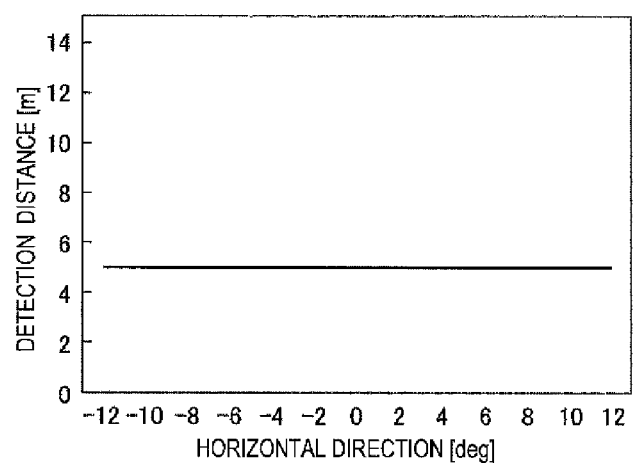
FIG. 15 is a diagram illustrating an example of distribution of detected distances to the frontal hill in a horizontal direction.

FIG. 15 illustrates an example of distribution of detected distances in the horizontal direction when the own vehicle is stopped in the front of a hill so as to be directed to a direction (direction substantially parallel to a direction in which the hill is extended) substantially perpendicular to an inclined surface of the hill. A transverse axis of the graph indicates an angle in the horizontal direction when the front direction of the own vehicle is set as 0 degree. An angle in a right direction of the own vehicle is indicated by a positive value. An angle in a left direction of the own vehicle is indicated by a negative value. A vertical axis of the graph indicates the detected distance in each of the directions.

As described in this example, when the own vehicle is stopped so as to be directed to the direction substantially perpendicular to the inclined surface of the frontal hill, the detected distance in the horizontal direction is substantially constant. When an object (for example, wall) having a surface which is widened in the horizontal direction so as to cross over a range wider than the width of the vehicle is in the front of the own vehicle and the vehicle is stopped so as to be directed to the direction substantially perpendicular to the surface, the detected distance in the horizontal direction is also changed similarly to that in FIG. 15. The object having a surface which is widened in the horizontal direction so as to cross over a range wider than the width of the vehicle also includes a hill. Accordingly, the determination unit 302 is not allowed to confirm that the frontal object is a hill, even when the detected distance in the horizontal direction is substantially constant.

Figure 16:
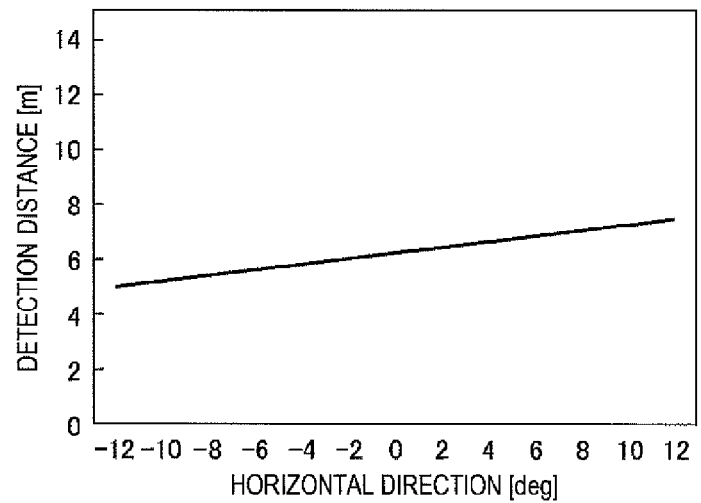
FIG. 16 is a diagram illustrating an example of distribution of detected distances to the obliquely-frontal hill in the horizontal direction.

FIG. 16 illustrates an example of the distribution of the detected distances in the horizontal direction when the own vehicle is stopped in the front of a hill so as to be directed to a direction which is slightly right oblique to an inclined surface of a hill. A transverse axis and a vertical axis of the graph are similar to those in FIG. 15.

As in this example, when the own vehicle is stopped in the front of a hill so as to be directed to a direction which is slightly right oblique to an inclined surface of the hill, the detected distances are gently changed so as to become gradually longer with being more to the right. In this case, ideally, the detected distances are changed linearly to the angle in the horizontal direction. For example, when the object having a surface which is widened in the horizontal direction so as to cross over a range wider than the width of the vehicle is in the front of the own vehicle, and the own vehicle is stopped so as to be directed to a direction which is slightly right oblique the surface, the detected distance in the horizontal direction is changed similarly to that in FIG. 16. Accordingly, the determination unit 302 is not allowed to confirm that the frontal object is a hill, even when the detected distance is gently changed in the horizontal direction.

When an object which is different from the object having a surface which is widened in the horizontal direction so as to cross over a range wider than the width of the vehicle is in the front of the own vehicle, the detected distances in the detection areas are not gently changed in the horizontal direction.

Figure 17:
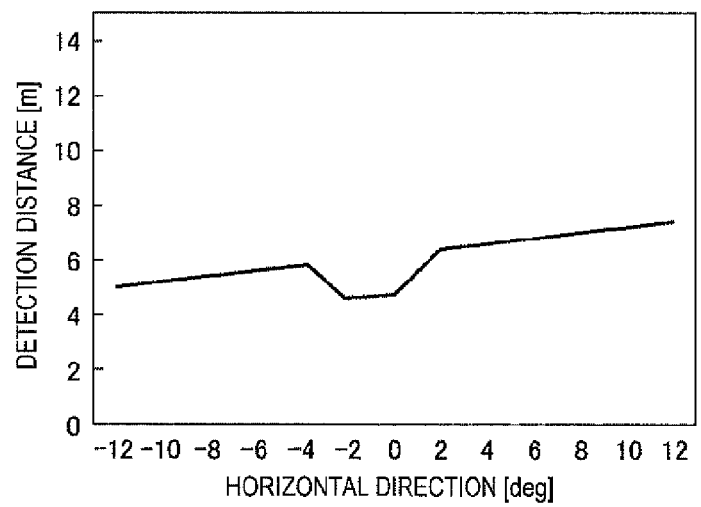
FIG. 17 is a diagram illustrating an example of distribution of detected distances in the horizontal direction when an object is present in the middle of a hill.

For example, FIG. 17 illustrates an example of the distribution of the detected distances in the horizontal direction when an object is in the middle of a hill, in a case where the own vehicle is stopped in the front of the hill so as to be directed to a direction which is slightly right oblique to an inclined surface of the hill. A transverse axis and a vertical axis of the graph are similar to those in FIG. 15.

As in this example, when an object is in the middle of a hill, the detected distance in the direction in which the object is present is drastically changed, and the detected distance is not gently changed in the horizontal direction. For example, in a case where the own vehicle is stopped in the front of a wall which is wider than the width of the vehicle, so as to be directed to a direction which is slightly right oblique to a surface of the wall, when a protrusion is at a portion of the surface of the wall, the detected distance in the horizontal direction is also changed similarly to that in FIG. 17.

Figure 18:
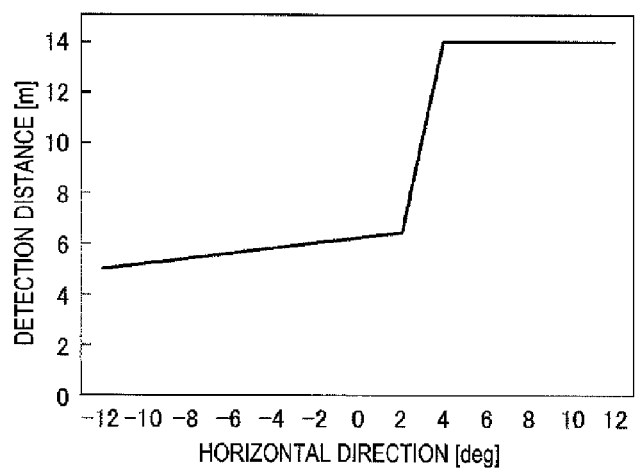
FIG. 18 is a diagram illustrating an example of distribution of detected distances in the horizontal direction when an object is present in the front left of a vehicle.

FIG. 18 illustrates an example of the distribution of the detected distances in the horizontal direction when a large object is in the front left direction of the own vehicle. A transverse axis and a vertical axis of the graph are similar to those in FIG. 15.

As in this example, when a large object is in the front of the own vehicle, the detected distance in the direction in which the object is present is drastically changed and the detected distance is not gently changed in the horizontal direction.

In the above descriptions, when the detected distances in the detection areas are gently changed in the horizontal direction, the determination unit 302 determines that there is a probability of that an object detected by the object detection unit 312 is a hill. A case where the detected distances in the detection areas are gently changed in the horizontal direction also includes a case where the detected distance in the horizontal direction is substantially constant, as illustrated in FIG. 15.

Figure 19:
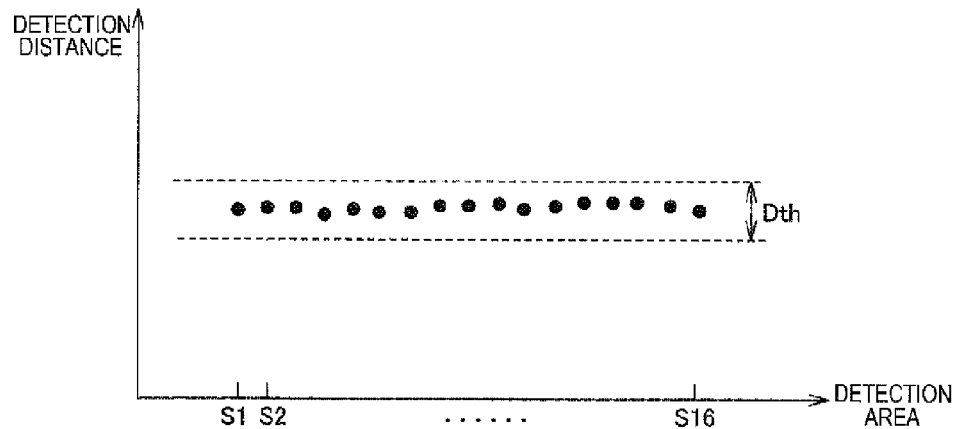
FIG. 19 is a diagram illustrating an example of a determination method of whether or not the detected distance is gently changed in the horizontal direction.

An example of a determination method of whether or not the detected distance is gently changed in the horizontal direction will be described with reference to FIG. 19. FIG. 19 is a graph illustrating an example of the detected distances in the detection areas. A transverse axis of the graph indicates the number of the detection area and a vertical axis indicates the detected distance in each of the detection areas.

For example, as illustrated in FIG. 19, the determination unit 302 determines that the detected distances are gently changed in the horizontal direction, when a difference between the maximum value and the minimum value of the detected distances in the detection area is equal to or less than a predetermined threshold value Dth. In addition, for example, the determination unit 302 determines that the detected distances are gently changed in the horizontal direction, when a difference between the detected distances in the detection areas which are adjacent to each other in the horizontal direction is equal to or less than a predetermined threshold value.

For example, the determination unit 302 may also determine whether or not the detected distances are gently changed in the horizontal direction, by using a statistical method. For example, the determination unit 302 determines that the detected distances are gently changed in the horizontal direction, when dispersion of the detected distance in the detection areas has a value equal to or less than a predetermined threshold value.

When the own vehicle is stopped so as to be directed to the direction substantially perpendicular to the inclined surface of the frontal hill, the determination unit 302 may reliably determine that the detected distances are gently changed in the horizontal direction, by using the above determination method. When the own vehicle is stopped so as to be directed to a direction oblique to the inclined surface of the frontal hill, it is assumed that the determination unit 302 sometimes cannot determine that the detected distances are gently changed in the horizontal direction according to the above determination method. That is, as an angle obtained by the own vehicle being directed to direction oblique to the inclined surface of a hill becomes greater, a slope in the graph for the distribution of the detected distances in the horizontal direction, which is described above with reference to FIG. 16, becomes greater. Thus, for example, a case where the difference between the maximum value and the minimum value of the detected distances in the detection area exceeds the threshold value Dth, and it is determined that the detected distances are not gently changed in the horizontal direction is assumed.

For example, the determination unit 302 obtains differences between the detected distances in the detection areas which are adjacent to each other in the horizontal direction, particularly, obtains differences for each of the adjacent areas. For example, when a difference between the detected distances in the detection area A1 and the detection area A2 is set as D1, a difference between the detected distances in the detection area A2 and the detection area A3 is set as D2, a difference between the detected distances in the detection area A3 and the detection area A4 is set as D3, the determination unit 302 calculates a differential value DD1 between the difference D1 and the difference D2 and calculates a differential value DD2 between the difference D2 and the difference D3. The determination unit 302 determines whether or not the detected distances are gently changed in the horizontal direction, based on the calculated differential value of the differences between the detected distances.

For example, the determination unit 302 determines that the detected distances are gently changed in the horizontal direction, when all of the differential values of the differences between the detected distances are equal to or less than a predetermined threshold value. For example, the determination unit 302 determines that the detected distances are gently changed in the horizontal direction, when a difference between the maximum value and the minimum value of the differential values of the differences between the detected distances is equal to or less than a predetermined threshold value. For example, the determination unit 302 determines that the detected distances are gently changed in the horizontal direction, when dispersion of the differential values of the difference between the detected distances has a value equal to or less than a predetermined threshold value.

As described above, when the own vehicle is stopped so as to be directed to a direction oblique to the inclined surface of the frontal hill, ideally, the detected distances are changed linearly to the angle in the horizontal direction. Accordingly, the differential values of the differences between the detected distances are substantially constant even when an erroneous difference is added. As described above, the determination processing is performed based on the differential values of the differences between the detected distances, and thus it is reliably determined that the detected distances are gently changed in the horizontal direction, even when the own vehicle is stopped so as to be directed to a direction oblique to the inclined surface of the frontal hill.

In Step S5, the determination unit 302 determines there is a probability of the detected object being a hill, when the detected distances in the detection areas (detected distances in the directions in the monitoring area) are gently changed in the horizontal direction. Then, the process proceeds to Step S6.

In Step S6, the collision avoidance control apparatus 16 limits a start of the vehicle. Specifically, the determination unit 302 notifies the command unit 303 that an object having a probability of a hill is detected in the front of the own vehicle. The command unit 303 provides a start limitation signal to the collision avoidance computation device 32.

The moving control unit 41 of the collision avoidance computation device 32 controls the prime mover control device 18 to suppress acceleration of the own vehicle, regardless of a stepping quantity of the accelerator pedal which is detected by the accelerator pedal detector 14. For example, the moving control unit 41 limits the throttle opening corresponding to the stepping quantity of the accelerator pedal such that an accelerated speed of the own vehicle is not equal to or greater than a predetermined limit value. For example, the moving control unit 41 limits the revolution count for the motor corresponding to the stepping quantity of the accelerator pedal such that the accelerated speed of the own vehicle is not equal to or greater than the predetermined limit value. The moving control unit 41 applies a command for the limited throttle opening or the limited revolution count of the motor to the prime mover control device 18.

Because acceleration of the own vehicle is suppressed in this manner, collision with the frontal object (which is in a range of the hazardous distance) occurred due to sudden acceleration of the own vehicle is prevented.

At this time, when forward movement of the own vehicle is prohibited in the process of Step S8 which will be described later, a start of the vehicle is limited in a state where prohibition of the forward movement is released. In this case, for example, a case where an object is in the middle of a hill or ahead of a wall, and the object moves after it is determined first that the detected object does not have a probability of a hill, and thus it is determined again that the detected object has a probability of a hill is assumed.

In Step S7, the determination unit 302 determines whether or not the detected object is a climbable hill.

Figure 20:
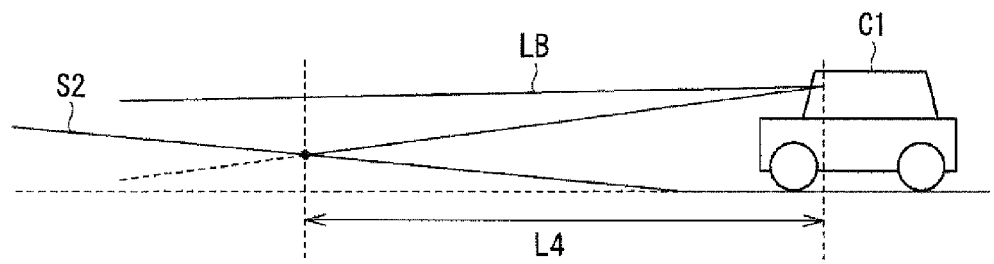
FIG. 20 is a diagram illustrating a determination method of whether or not a frontal object is a climbable hill.
Figure 20:
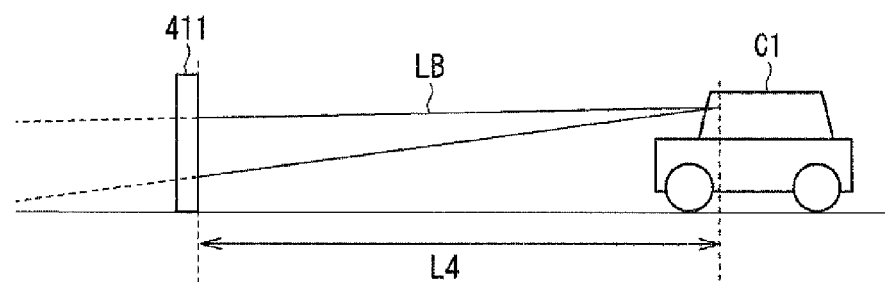
Figure 21:
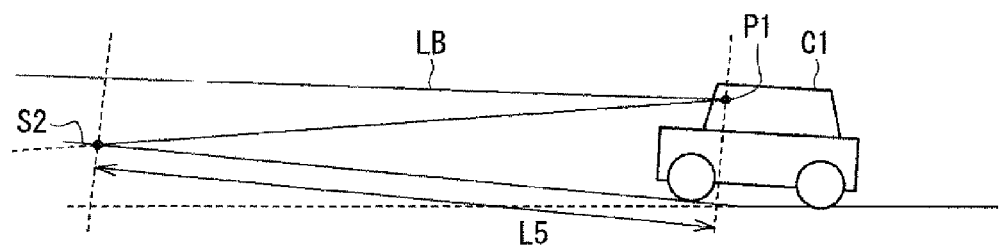
FIG. 21 is a diagram illustrating the determination method of whether or not the frontal object is a climbable hill.
Figure 21:
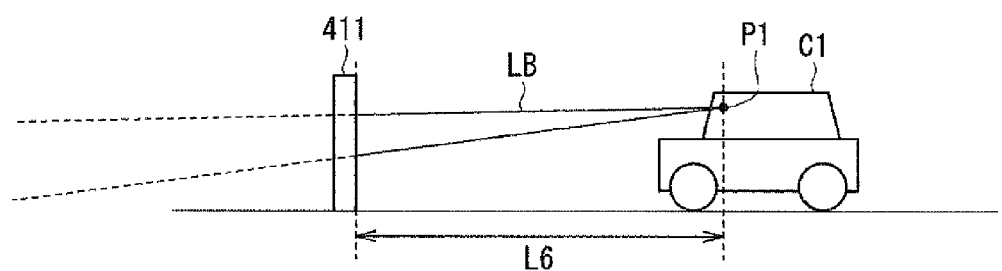

An example of a determination method of whether or not the frontal object is a climbable hill will be described with reference to FIGS. 20 and 21. FIGS. 20 and 21 are diagrams obtained by comparing a change of the detected distances when the vehicle C approaches the hill S2 with that when the vehicle C approaches a wall 411.

FIG. 20 illustrates an example of a state before the vehicle C starts. In the figure of an upper side of FIG. 20, the vehicle C is stopped in the front of the hill S2. In the figure of a lower side of FIG. 20, the vehicle C is stopped in the front of the wall 411. A detected distance from the vehicle C to the hill S2 and a detected distance from the vehicle C to the wall 411 are also set as distances L4 which are shorter than the hazardous distance. A gradient angle of the hill S2 is set to be smaller than the gradient angle γ0 of the hill S0 in FIG. 11.

In a case of this example, as described above, in Step S5, it is determined that there is a probability of an object (hill S2 or wall 411) in the front of the own vehicle being a hill, and a start of the vehicle is limited. After forward movement is started, the vehicle C approaches the hill S2 and the wall 411 in travelling slowly.

FIG. 21 illustrates an example of a state where the vehicle C approaches the hill S2 and the wall 411 with the same distance, from the state illustrated in. FIG. 20. In the figure of an upper side of FIG. 21, the vehicle C has a state of starting to climb the hill S2 and a detected distance L5 from the vehicle C to the hill S2 is longer than the detected distance L4 in FIG. 20. In the figure of a lower side of FIG. 21, a detected distance L6 from the vehicle C to the wall 411 is shorter than the detected distance L4 in FIG. 20 and finally, is shorter than the shortest hill detected distance Lmin.

For example, the moving control unit 41 detects the moving direction of the own vehicle, based on the detection result of the vehicle speed by the speed sensor 12, and the detection result of a position of the shift lever or the select lever by the shift position detector 13. The moving control unit 41 supplies a detection result to the determination unit 302.

As a detection method of the moving direction of the own vehicle, any method may be employed. For example, the moving control unit 41 may detect the moving direction of the own vehicle based on travelling information supplied from a cruise control device of the own vehicle.

The determination unit 302 determines that the detected object is a climbable hill, when the detected distance to the object becomes longer before the detected distance is less than the shortest hill detected distance Lmin, while the moving direction of the own vehicle is a direction of approaching the object (while movement of the own vehicle toward the object is detected). The determination unit 302 determines that the detected object is not a climbable hill, when the detected distance to the object is less than the shortest hill detected distance Lmin.

In Step S7, when it is determined that the detected object is not a climbable hill, the process proceeds to Step S8.

In Step S5, the determination unit 302 determines that there is no probability of that the detected object is a hill, when the detected distances in the detection areas are not gently changed in the horizontal direction. Then, the processes of Steps S6 and S7 are skipped and the process proceeds to Step S8.

In Step S4, when the detected distance to the object is less than the shortest hill detected distance Lmin, that is, when the detected object is not a climbable hill, the processes of Steps S5 to S7 are skipped and the process proceeds to Step S8.

In Step S8, the collision avoidance control apparatus 16 prohibits forward movement. Specifically, the determination unit 302 notifies the command unit 303 that an object having a probability of collision is detected in the front of the own vehicle. The command unit 303 supplies a forward-movement prohibition signal to the collision avoidance computation device 32.

When the own vehicle does not move forward, the moving control unit 41 of the collision avoidance computation device 32 controls the prime mover control device 18 to cause the own vehicle not to travel forward, regardless of the position of the shift lever or the select lever, and the stepping quantity of the accelerator pedal. When the own vehicle moves forward, the moving control unit 41 stops the own vehicle firstly, and then controls the prime mover control device 18 to cause the own vehicle not to travel forward.

Rearward movement of the own vehicle is not necessarily prohibited. In the following descriptions, a case where rearward movement of the own vehicle is not prohibited will be described.

Then, the process returns to Step S2. The processes of Steps S2 to S8 are repeated until it is determined in Step S2 that an object is not detected, until it is determined in Step S3 that the detected distance to an object exceeds the hazardous distance, or until it is determined in Step S7 that the detected object is a climbable hill.

In Step S7, when it is determined that the detected object is a climbable hill, the process proceeds to Step S9.

In Step S9, the collision avoidance control apparatus 16 releases the limit of a start. Specifically, the determination unit 302 notifies the command unit 303 that a climbable hill is detected in the front of the own vehicle. The command unit 303 supplies a vehicle start limit release signal to the collision avoidance computation device 32. The moving control unit 41 of the collision avoidance computation device 32 releases the limit of a start. For example, the moving control unit 41 releases the limit of the throttle opening or the revolution count of the motor corresponding to the stepping quantity of the accelerator pedal. Thus, the own vehicle can normally travel.

Then, the collision avoidance control processing when a vehicle starts is ended.

The process proceeds to Step S10 when it is determined in Step S2 that an object is not detected, or when it is determined in Step S3 that the detected distance to an object exceeds the hazardous distance.

In Step S10, the command unit 303 determines whether or not forward movement is prohibited. Specifically, the determination unit 302 notifies the command unit 303 that there is no object in the range of the hazardous distance. The command unit 303 determines that forward movement is prohibited, when a state of prohibiting the forward movement of the own vehicle is maintained and is not released in the above-described process of Step S8. Then, the process proceeds to Step S11.

In this case, for example, a case where an object is moved or the own vehicle moves rearward and thus the object is not present within the hazardous distance, when the object other than a climbable hill is detected within the hazardous distance from the front of the own vehicle and forward movement is prohibited is assumed.

In Step S11, the collision avoidance control apparatus 16 releases prohibition of the forward movement. Specifically, the command unit 303 supplies a forward movement prohibition release signal to the collision avoidance computation device 32. The moving control unit 41 of the collision avoidance computation device 32 releases the prohibition of the forward movement. Thus, the own vehicle can normally travel.

Then, the collision avoidance control processing when a vehicle starts is ended.

When it is determined in Step S10 that the forward movement is not prohibited, the process of Step S11 is skipped and the collision avoidance control processing when a vehicle starts is ended.

In the above-described manner, collision with the frontal object occurred due to sudden acceleration of the own vehicle is prevented.

Detection accuracy for a hill in the front of the own vehicle is improved, and erroneous detection that a climbable hill is an obstacle is prevented. Thus, prohibition of a start of the own vehicle is prevented or excessive suppression of acceleration causing the own vehicle not to climb a hill is prevented, regardless of there is a climbable hill in the front of the own vehicle.

<2. Modification Example>

In the following descriptions, a modification example of the above-described embodiment of the invention will be described.

<Modification Example of Configuration of Collision Avoidance Control Apparatus>

A configuration of the collision avoidance control apparatus is not limited to the example illustrated in FIGS. 1 and 2, and may be changed if necessary.

For example, the laser radar device 31 and the collision avoidance computation device 32 may be combined or division of the functions of the laser radar device 31 and the collision avoidance computation device 32 may be changed.

For example, the laser radar device 31 and the collision avoidance computation device 32 may be integrated. In this case, for example, the laser radar device 31 controls the warning device 17, the prime mover control device 18, and the brake control device 19.

For example, the function of the command unit 303 in the laser radar device 31 may be provided in the collision avoidance computation device 32. In this case, for example, the detection result regarding the presence or absence of an object in the monitoring area, the type of the object, a distance to the object, a direction of the object, a relative speed of the object, or the like is supplied to the collision avoidance computation device 32 from the laser radar device 31. The collision avoidance computation device 32 determines whether or not the start of the vehicle is limited or forward movement is prohibited, based on the detection result supplied from the laser radar device 31.

In addition, for example, the functions of the determination unit 302 and the command unit 303 in the laser radar device 31 may be provided in the collision avoidance computation device 32. In this case, for example, the detection result regarding the presence or absence of an object in the monitoring area, a distance to the object, a relative distance of the object, a direction of the object, the detected distance in each of the detection areas is supplied to the collision avoidance computation device 32 from the laser radar device 31. The collision avoidance computation device 32 determines the type of the detected object, and determines whether or not the start of the vehicle is limited or forward movement is prohibited, based on a result thereof.

For example, the control unit 61 and the computation unit 65 in the laser radar device 31 may be combined or division of the functions of the control unit 61 and the computation unit 65 may be changed.

For example, the number of the photoreceptor elements 202, the number of the TIAs 261, the number of the PGAs 262, and the number of the ADCs 263 may be varied as necessary.

<Modification Example of Determination Method of Whether or Not There is Probability of Hill>

In the above descriptions, an example in which it is determined that there is a probability of the detected object being a hill, when the detected distances in the detection areas are gently changed in the horizontal direction is described.

For example, when a guardrail is present on a road side, the guardrail is at a position higher than the height of a surface of the road. Thus, a detected distance for the guardrail is slightly shorter than a detected distance for the surface of the road. Accordingly, when the guardrail is present on the road side of a hill, the detected distances in the horizontal direction is not gently changed and it may be determined that there is no probability of a hill. However, the hazardous distance used in the process of Step S3 in FIG. 10 is only about several meters, and a spread of laser beams in the range of the hazardous distance is only substantially the width of the vehicle. Thus, it is assumed that a probability of detection of a guardrail on the road side of the hill is significantly low when the hill is present in the range of the hazardous distance. Accordingly, it is considered that a probability of erroneous determination by an object such as a guardrail on the road side in that there is no probability of a hill is significantly low regardless of that a hill is in the range of the hazardous distance.

For example, measures for more reliable prevention of the erroneous determination by an object on the road side may be performed. For example, the determination unit 302 may determine that there is a probability of a hill, when the detected distances are gently changed in the horizontal direction in a range obtained by subtracting a predetermined range of right and left end portions in the monitoring area. In addition, for example, the determination unit 302 may determine that there is a hill having a guardrail installed thereon on the road side, when the detected distance is reduced by a distance corresponding to the height of the guardrail at at least one of the left end and the right end of the monitoring area, and the detected distances in the detection areas are gently changed in the other range in the horizontal direction.

<Other Modification Examples>

For example, when a start of the vehicle is limited or forward movement is prohibited, the command unit 303 of the laser radar device 31 may command the notification control unit 42 to warn a driver. The notification control unit 42 may control the warning device 17 to warn a driver. For example, the notification control unit 42 may display a warning screen on a display, cause an indicator lamp to turn on or off, or sound warning sound, a buzzer, or the like so as to warn a driver.

<Regarding Application Range of One or More Embodiments of Invention>

The one or more embodiments of the invention may be applied to an apparatus or a system which is provided in a vehicle, and in which the measurement light is emitted in a predetermined monitoring direction, and an object is detected based on the intensity of the reflected light of the measurement light, in addition to the above-described example.

For example, the one or more embodiments of the invention may also be applied to a case using a scan type laser radar device in which reflected light is received while measurement light is scanned in the horizontal direction, in addition to a laser radar device in which measurement light beams are emitted simultaneously in a monitoring direction and a plurality of photoreceptor elements receives reflected light beams simultaneously.

Figure 22:
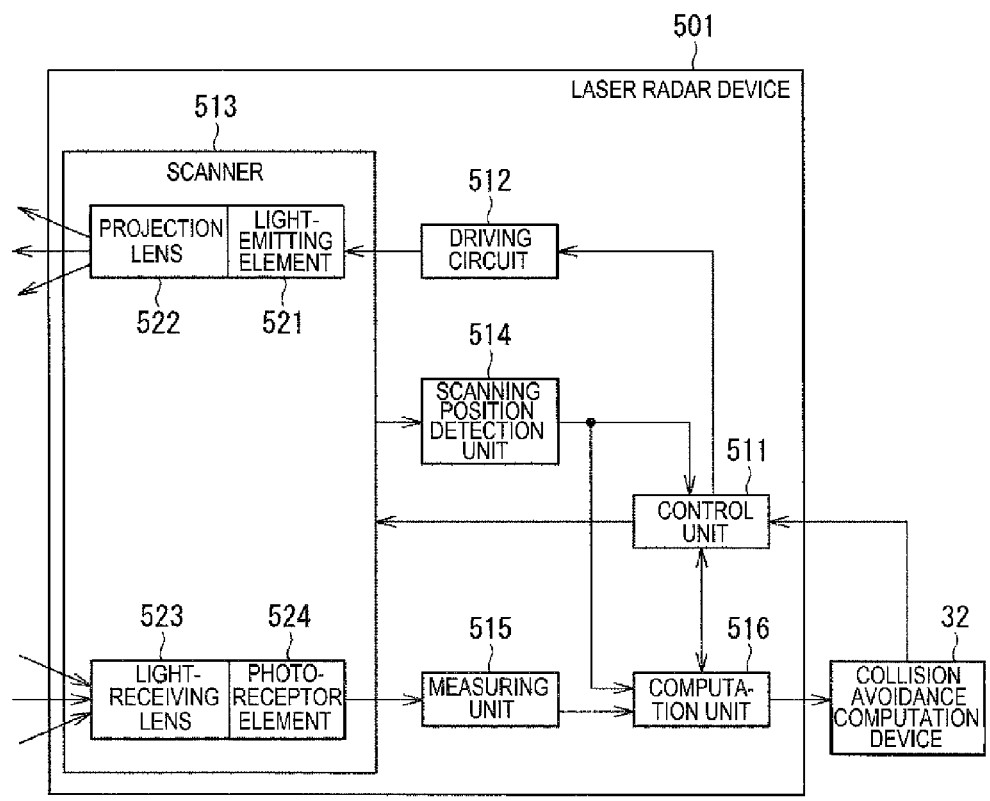
FIG. 22 is a diagram illustrating a modification example of the laser radar device.

FIG. 22 illustrates a configuration example of a scan type laser radar device 501. The laser radar device 501 includes a control unit 511, a driving circuit 512, a scanner 513, a scanning position detection unit 514, a measuring unit 515, and a computation unit 516. The scanner 513 includes a light-emitting element 521, a projection lens 522, a light-receiving lens 523, and a photoreceptor element 524.

The driving circuit 512 controls light emission intensity, a light emission timing, or the like of the light-emitting element 521 under a control of the control unit 511.

The light-emitting element 521 includes, for example, a laser diode and emits measurement light (laser pulse) under a control of the driving circuit 512. The measurement light emitted from the light-emitting element 521 is projected to the front of the own vehicle through the projection lens 522. At this time, the scanner 513 scans the measurement light in the monitoring area in the horizontal direction, under a control of the control unit 511.

The scanning position detection unit 514 detects a scanning position of the measurement light in the horizontal direction in the scanner 513 and supplies a detection result to the control unit 511 and the computation unit 516.

The photoreceptor element 524 includes, for example, a photodiode. The photoreceptor element 524 receives reflected light of the measurement light through the light-receiving lens 523. The photoreceptor element 524 performs photoelectric conversion of the received reflected light into a light reception signal having a current value in accordance with the light-receiving quantity, and supplies the obtained light reception signal to the measuring unit 515.

The measuring unit 515 measures a light reception value for the reflected light, based on the analog light reception signal supplied from the photoreceptor element 524, similarly to the measuring unit 64 in FIG. 8. The measuring unit 515 supplies a digital light reception signal indicating the measured light reception value to the computation unit 516. Since the photoreceptor element 524 is only one, the measuring unit 515 is different from the measuring unit 64 in FIG. 8 and one TIA, one PGA, and one ADC (none illustrated) are provided.

The computation unit 516 detects whether or not an object is in the monitoring area, the type of the object, a distance to the object, a direction of the object, a relative speed of the object, and the like, based on the light reception signal supplied from the measuring unit 515, similarly to the computation unit 65 in FIG. 9. The computation unit 516 supplies a detection result to the control unit 511. The computation unit 516 transmits commands regarding a start and acceleration of the own vehicle, warning a driver, and the like to the collision avoidance computation device 32 based on the detection result.

The one or more embodiments of the invention may be also applied to a case using a radar device using measurement light other than the laser or a millimeter wave.

The above descriptions are made by using a case where a vehicle moves forward, as an example. However, the one or more embodiments of the invention may be also applied to a case where a vehicle moves rearward. For example, similarly, when a vehicle starts to move rearward, it is possible to monitor the rear of the vehicle, to avoid collision with a rear object, and to climb a rear hill through processes similarly to the processes which are described above with reference to FIG. 10.

The type of a vehicle to which the one or more embodiments of the invention is applied is not particularly limited. For example, the one or more embodiments of the invention may be applied to vehicles such as a two-wheeled vehicle, a three-wheeled truck, a light truck, a compact car, a large car, a large bus, a heavy-duty truck, a large special car, and a small special car and the like.

<Configuration Example of Computer>

The above-described series of processes may be performed by hardware or software. When the series of processes may be performed by software, a program forming the software is installed on a computer. An example of the computer includes a computer assembled by dedicated hardware, a general personal computer that can perform various functions by installing various programs, and the like.

Figure 23:
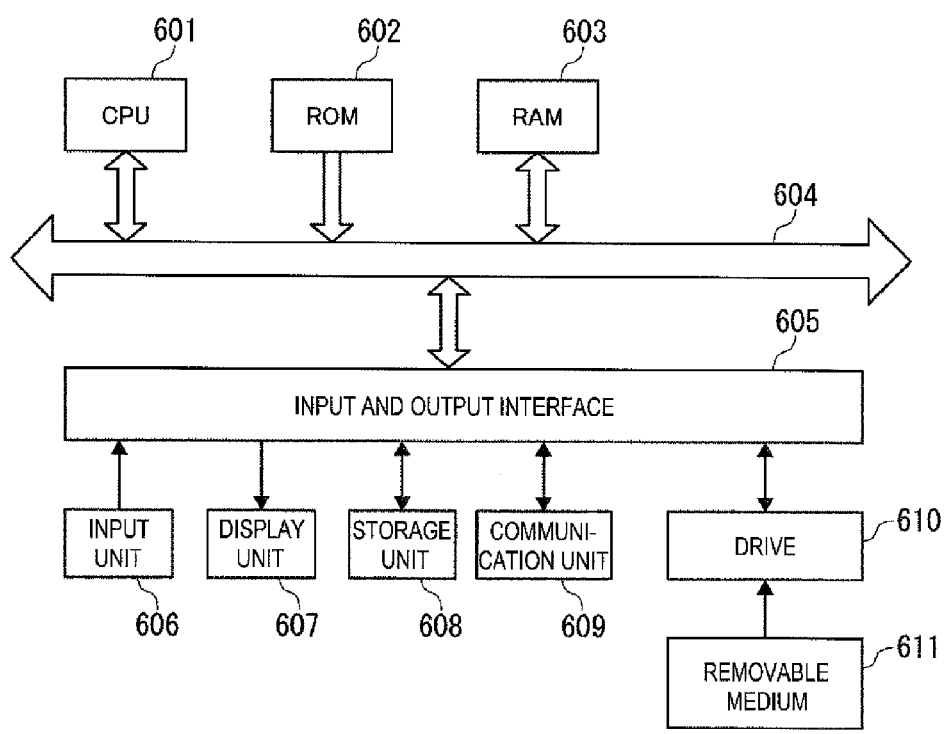
FIG. 23 is a block diagram illustrating a configuration example of a computer.

FIG. 23 is a block diagram illustrating a configuration example of hardware of a computer which performs the above-described series of processes by using a program.

In the computer, a central processing unit (CPU) 601, a read only memory (ROM) 602, a random access memory (RAM) 603 are connected to each other through a bus 604.

An input and output interface 605 is connected to the bus 604. An input unit 606, an output unit 607, a storage unit 608, a communication unit 609, and a drive 610 are connected to the input and output interface 605.

The input unit 606 includes a keyboard, a mouse, a microphone, and the like. The output unit 607 includes a display, a speaker, and the like. The storage unit 608 includes a hard disk, a non-volatile memory, and the like. The communication unit 609 includes a network interface and the like. The drive 610 drives a removable medium 611 such as a magnetic disk, an optical disk, a magneto-optical disk, and a semiconductor memory.

In the computer configured as described above, for example, the CPU 601 loads a program stored in the storage unit 608 in the RAM 603 through the input and output interface 605 and the bus 604, and executes the loaded program. Thus, the above-described series of processes is performed.

The program executed by the computer (CPU 601) may be stored in the removable medium 611 as a package media, for example, and be provided. The program may be provided through a wired or wireless transmission medium such as a local area network, the Internet, and digital satellite broadcasting.

In the computer, the program may be installed in the storage unit 608 through the input and output interface 605 by mounting the removable medium 611 in the drive 610. The program may be received by the communication unit 609 through a wired or wireless transmission medium, and may be installed in the storage unit 608. In addition, the program may have been installed in the ROM 602 or the storage unit 608 in advance.

The program executed by the computer may be a program in which processing is performed in a time sequence in an order described in this specification, or may be a program in which processing is performed in parallel or at necessary timings, for example, a timing when calling is performed.

The one or more embodiments of the invention embodiment is not limited to the above-described embodiment, and may be variously changed in a range without departing from a scope of the invention.

While the invention has been described with respect to a limited number of embodiments, those skilled in the art, having benefit of this disclosure, will appreciate that other embodiments can be devised which do not depart from the scope of the invention as disclosed herein. According, the scope of the invention should be limited only by the attached claims.

The invention claimed is:

1. An object detecting apparatus which is mountable in a vehicle and which detects an object in a travelling direction of the vehicle, said apparatus comprising:
    an emitter that emits measurement light to a monitoring area in the travelling direction, the monitoring area being widened radially in a vehicle width direction of the vehicle;
    a photoreceptor that receives reflected light of the measurement light from a plurality of directions in the monitoring area, and outputs a light reception signal in accordance with intensity of the reflected light in each of the directions;
    a detector that detects a distance to an object in each of the directions in the monitoring area, based on a time difference from emission of the measurement light to reception of the reflected light; and
    a determination unit that identifies a detected object which is an object detected by the detector,
    wherein the determination unit determines whether or not there is a possibility of the detected object being a hill, based on a change of the detected distance in the vehicle width direction among the directions in the monitoring area.

2. The object detecting apparatus according to claim 1,
    wherein if the change of the detected distance in the vehicle width direction among the directions in the monitoring area is less than a predetermined slope, the determination unit determines that there is a possibility of the detected object being a hill, and
    wherein if the change of the detected distance in the vehicle width direction among the directions in the monitoring area is not less than the predetermined slope, the determination unit determines that there is no possibility of the detected object being a hill.

3. The object detecting apparatus according to claim 2,
    wherein the determination unit determines that the detected object is a hill, if the change of the detected distance in the vehicle width direction among the directions in the monitoring area is less than the predetermined slope, and if the detected distance to the detected object increases while movement of the vehicle toward the detected object is detected by using information from outside the object detecting apparatus.

4. The object detecting apparatus according to claim 1,
    wherein a maximum gradient climbable by the vehicle is predetermined,
    wherein a shortest distance threshold is calculated based on the maximum gradient, and
    wherein the determination unit determines that the detected object is not a climbable hill, if the detected distance to the detected object is less than the shortest distance threshold.

5. The object detecting apparatus according to claim 1,
wherein the emitter emits the measurement light so as to spread radially in the monitoring area,
wherein the photoreceptor comprises a plurality of photoreceptor elements which are arranged in the vehicle width direction, and
wherein each of the photoreceptor elements receives the reflected light from each of the directions in the monitoring area and outputs a light reception signal in accordance with intensity of the received reflected light.

6. The object detecting apparatus according to claim 1,
wherein the emitter scans the measurement light in the vehicle width direction in the monitoring area.

7. A vehicle collision avoidance control apparatus comprising:
an emitter that emits measurement light to a monitoring area in a travelling direction of a vehicle, the monitoring area being widened radially in a vehicle width direction;
a photoreceptor that receives reflected light of the measurement light from a plurality of directions in the monitoring area, and outputs a light reception signal in accordance with intensity of the reflected light in each of the directions;
a detector that detects a distance to an object in each of the directions in the monitoring area, based on a time difference from emission of the measurement light to reception of the reflected light;
a determination unit that identifies a detected object which is an object detected by the detector; and
a moving controller that controls travelling of the vehicle,
wherein if a change of the detected distance in the vehicle width direction among the directions in the monitoring area is less than a predetermined slope, the determination unit determines that there is a possibility of the detected object being a hill,
wherein if the change of the detected distance in the vehicle width direction among the directions in the monitoring area is not less than the predetermined slope, the determination unit determines that there is no possibility of the detected object being a hill,
wherein if the detected distance to the detected object is less than a predetermined distance and it is determined that there is a possibility of the detected object being a hill, the moving controller performs control to suppress acceleration of the vehicle, and
wherein if the detected distance to the detected object is less than a predetermined distance and it is determined that there is no possibility of the detected object being a hill, the moving controller performs control to prohibit travelling of the vehicle in the travelling direction.

8. A vehicle collision avoidance control apparatus comprising:
an emitter that emits measurement light to a monitoring area in a travelling direction of a vehicle, the monitoring area being widened radially in a vehicle width direction;
a photoreceptor that receives reflected light of the measurement light from a plurality of directions in the monitoring area, and outputs a light reception signal in accordance with intensity of the reflected light in each of the directions;
a detector that detects a distance to an object in each of the directions in the monitoring area, based on a time difference from emission of the measurement light to reception of the reflected light; and
a moving controller that controls travelling of the vehicle,
wherein a maximum gradient climbable by the vehicle is predetermined,
wherein a shortest distance threshold is calculated based on the maximum gradient, and
wherein the moving controller performs control to prohibit travelling of the vehicle in the travelling direction if a detected distance to a detected object which is an object detected by the detector is less than the shortest distance threshold.

* * * * *